(12) United States Patent
Li et al.

(10) Patent No.: US 11,218,257 B2
(45) Date of Patent: Jan. 4, 2022

(54) METHOD AND DEVICE FOR ADJUSTING CONTENTION WINDOW SIZE

(71) Applicant: HUAWEI TECHNOLOGIES CO., LTD., Guangdong (CN)

(72) Inventors: Yuan Li, Bonn (DE); Lei Guan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 82 days.

(21) Appl. No.: 16/702,957

(22) Filed: Dec. 4, 2019

(65) Prior Publication Data

US 2020/0106565 A1 Apr. 2, 2020

Related U.S. Application Data

(63) Continuation of application No. PCT/CN2018/089373, filed on May 31, 2018.

(30) Foreign Application Priority Data

Jun. 6, 2017 (CN) .......................... 201710420188.9

(51) Int. Cl.
*H04L 1/18* (2006.01)
*H04W 76/28* (2018.01)
(Continued)

(52) U.S. Cl.
CPC .......... *H04L 1/1819* (2013.01); *H04L 5/0055* (2013.01); *H04W 72/042* (2013.01); *H04W 74/0808* (2013.01); *H04W 76/28* (2018.02)

(58) Field of Classification Search
CPC .. H04L 1/1819; H04L 5/0055; H04W 76/028; H04W 72/042
See application file for complete search history.

(56) References Cited

U.S. PATENT DOCUMENTS

2018/0124828 A1  5/2018  Kim et al.
2018/0139779 A1*  5/2018  Kim .......................... H04L 1/00
(Continued)

FOREIGN PATENT DOCUMENTS

CN     105682239 A    6/2016
CN     106656428 A    5/2017
(Continued)

OTHER PUBLICATIONS

LG Electronics, "DL LBT design in LAA," 3GPP TSG RAN WG1 meeting #83, R1-156856, Anaheim, USA, Nov. 15-22, 2015, 6 pages.
(Continued)

*Primary Examiner* — Jamal Javaid
*Assistant Examiner* — Ryan C Kavleski
(74) *Attorney, Agent, or Firm* — Fish & Richardson P.C.

(57) ABSTRACT

The present disclosure relates to methods and devices for adjusting a contention window size. One example method includes obtaining, by a first device, at least two hybrid automatic repeat request (HARQ) states corresponding to a first HARQ process identifier, where the at least two HARQ states are different, and the first HARQ process identifier is a HARQ process identifier used when the first device sends data to a second device in a reference time unit, determining, by the first device, a valid HARQ state in the at least two HARQ states, and adjusting a contention window size for a first burst based on the valid HARQ state, where the first burst is later than the reference time unit.

20 Claims, 12 Drawing Sheets

Step 300: A first device obtains at least two HARQ states corresponding to a first hybrid automatic repeat request HARQ process identifier, where the at least two HARQ states are different, and the first HARQ process identifier is a HARQ process identifier used when the first device sends data to a second device in a reference time unit Step 310: The first device determines a valid HARQ state in the at least two HARQ states Step 320: The first device adjusts a contention window size for a first burst based on the valid HARQ state, where the first burst is later than the reference time unit

(51) Int. Cl.
*H04L 5/00* (2006.01)
*H04W 72/04* (2009.01)
*H04W 74/08* (2009.01)

(56) References Cited

U.S. PATENT DOCUMENTS

| | | | |
|---|---|---|---|
| 2018/0254858 A1* | 9/2018 | He | H04W 74/0808 |
| 2018/0302195 A1* | 10/2018 | Kim | H04W 28/065 |
| 2018/0310339 A1 | 10/2018 | Li et al. | |
| 2018/0367282 A1 | 12/2018 | Li et al. | |
| 2019/0007972 A1 | 1/2019 | Gou et al. | |
| 2020/0045734 A1* | 2/2020 | Park | H04W 16/14 |

FOREIGN PATENT DOCUMENTS

| | | |
|---|---|---|
| CN | 106658742 A | 5/2017 |
| WO | 2016182355 A1 | 11/2016 |
| WO | 2016182366 A1 | 11/2016 |
| WO | 2017069798 A1 | 4/2017 |

OTHER PUBLICATIONS

3GPP TS 36.213 V14.2.0 (Mar. 2017), "3rd Generation Partnership Project; Technical Specification Group Radio Access Network;Evolved Universal Terrestrial Radio Access (E-UTRA); Physical layer procedures( Release 14)," Mar. 2017, 454 pages.
Lenovo, "Contention window size adjustment for LBT Category 4 for LAA PDSCH transmission," 3GPP TSG RAN WG1 Meeting #83, R1-156733, Anaheim, USA, Nov. 15-22, 2015, 6 pages.
Huawei, HiSilicon, "Contention window size adjustment for UL category 4 LBT for eLAA," 3GPP TSG RAN WG1 Meeting #85, R1-164073, Anaheim, USA, Nov. 15-22, 2015, 6 pages.
Office Action issued in Chinese Application No. 201710420188.9 dated Mar. 24, 2020, 11 pages (with English translation).
Office Action issued in Korean Application No. 2019-7037970 dated Oct. 23, 2020, 8 pages (with English translation).
Sharp, "LAA contention window size adjustment with HARQ-ACK," 3GPP TSG RAN WG1 Meeting #82bis, R1-155566, Malmo, Sweden, Oct. 5-9, 2015, 6 pages.

* cited by examiner

METHOD AND DEVICE FOR ADJUSTING CONTENTION WINDOW SIZE

CROSS-REFERENCE TO RELATED DISCLOSURES

This application is a continuation of International Application No. PCT/CN2018/089373, filed on May 31, 2018, which claims priority to Chinese Patent Application No. 201710420188.9, filed on Jun. 6, 2017. The disclosures of the aforementioned applications are hereby incorporated by reference in their entireties.

TECHNICAL FIELD

This application relates to the field of wireless communications technologies, and in particular, to a method and device for adjusting a contention window size.

BACKGROUND

To implement friendly coexistence with base stations and UEs of different operators, and inter-system wireless nodes such as Wi-Fi on an unlicensed spectrum, a licensed-assisted access (LAA)/enhanced licensed-assisted access (eLAA)/Multefire system uses a listen-before-talk (LBT) channel access mechanism. For example, before performing downlink transmission, a sending node needs to sense a channel, and sends downlink information after sensing that the channel is idle. Specifically, downlink LBT is random backoff-based clear channel assessment (CCA). The sending node randomly generates backoff counters N between 0 and a contention window size (CWS) evenly, and performs sensing at a granularity of a sensing slot (CCA slot). If detecting, in the listening slot, that the channel is idle, the sending node subtracts 1 from the backoff counter. If detecting, in the listening slot, that the channel is busy, the sending node suspends the backoff counter, in other words, the backoff counter N remains unchanged in a period of time in which the channel is busy, until s detected that the channel is idle. When the backoff counter decreases to 0, the sending node may immediately occupy the channel.

Further, the sending node dynamically adjusts a downlink CWS for the downlink LBT, in other words, the sending node dynamically adjusts a CWS for a downlink burst based on a hybrid automatic repeat request-acknowledgment (HARQ-ACK) state fed back by a terminal for a downlink reference subframe. Specifically, when determining that a proportion of negative acknowledgments (NACK) in the HARQ-ACK state for the downlink reference subframe is relatively large, the sending node increases the CWS, so as to avoid a collision with a surrounding contention node by prolonging a sensing time, and implement friendly coexistence. When a proportion of acknowledgments (ACK) in the HARQ-ACK state for the downlink reference subframe is relatively large, the sending node decreases the CWS, so as to reduce a sensing time, and access the channel more quickly. Similar to the downlink LBT, when uplink LBT is random backoff-based CCA, the terminal dynamically adjusts an uplink CWS for the uplink LBT, in other words, the terminal dynamically adjusts a CWS for an uplink burst based on a HARQ-ACK state for an uplink reference subframe. When the HARQ-ACK state for the uplink reference subframe is an ACK, the terminal decreases the CWS; when the HARQ-ACK state for the uplink reference subframe is a HACK, the terminal increases the CWS.

For a Multefire 1.0 system, a DL HARQ-ACK feedback for a downlink data channel is introduced. The DL HARQ-ACK may be carried on a PUCCH on an unlicensed spectrum, or may be carried on a PUSCH on the unlicensed spectrum. DL HARQ-ACK information is based on bit mapping, and includes HARQ-ACK states corresponding to all HARQ processes in a downlink HARQ process set. In addition, for a GUL-based Multefire 1.1 system, to help a network device to feed back a receiving state for a GUL PUSCH, a UL HARQ-ACK feedback for an uplink data channel is introduced, and is carried in grant-free downlink control information (G-DCI). UL HARQ-ACK information is based on bit mapping, and includes HARQ-ACK states corresponding to all HARQ processes in an uplink HARQ process set.

Therefore, new DL HARQ-ACK feedback information is introduced for downlink transmission on the unlicensed spectrum, and new UL HARQ-ACK feedback information is introduced for uplink transmission on the unlicensed spectrum. It is urgent to accurately adjust a downlink CWS and an uplink CWS, so that the downlink CWS and the uplink CWS can accurately reflect a channel state, and implement friendly coexistence with a surrounding contention node.

SUMMARY

Embodiments of this application provide a method and device for adjusting a contention window size, so as to improve accuracy of contention window size adjustment.

The method in the embodiments of this application is as follows:

According to a first aspect, a method for adjusting a contention window size is provided. The method includes: obtaining, by a first device, at least two HARQ states corresponding to a first hybrid automatic repeat request HARQ process identifier, where the at least two HARQ states are different, and the first HARQ process identifier is a HARQ process identifier used when the first device sends data to a second device in a reference time unit; determining, by the first device, a valid HARQ state in the at least two HARQ states; and adjusting a contention window size for a first burst based on the valid HARQ state, where the first burst is later than the reference time unit. Therefore, according to the method provided in this embodiment of this application, the first device can avoid inaccurate CWS adjustment caused by subsequently resetting a HARQ-ACK to a default state, so as to improve accuracy of contention window adjustment, and improve channel access efficiency.

In a possible design, any HARQ states in the at least two HARQ states are corresponding to a same transport block corresponding to the first HARQ process identifier. Therefore, this embodiment of this application does not impose a limitation on whether the first HARQ process identifier is corresponding to one transport block or a plurality of transport blocks, and can be applied to a plurality of application scenarios.

In a possible design, the first device is a network device, the second device is a terminal device, and the first HARQ process identifier is a HARQ process identifier for the second device. Therefore, this embodiment of this application can be applied to a downlink transmission scenario.

In a possible design, the first device is a terminal device, the second device is a network device, and the first HARQ process identifier is a HARQ process identifier corresponding to the first device. Therefore, this embodiment of this application can be applied to an uplink transmission scenario.

In a possible design, the at least two HARQ states are carried in at least two uplink time units, and the valid HARQ state is a HARQ state carried in an earliest uplink time unit in the at least two uplink time units. Therefore, according to the method provided in this embodiment of this application, the valid HARQ state can be easily determined.

In a possible design, when the at least two HARQ states each are a HARQ state that is sent by the second device and that is detected by the first device, the valid HARQ state is the HARQ state carried in the earliest uplink time unit in the at least two uplink time units. Therefore, according to the method provided in this embodiment of this application, after a DTX state is excluded, the HARQ state carried in the earliest uplink time unit is selected as the valid HARQ state, so that the valid HARQ state is more accurate.

In a possible design, when the at least two HARQ states include a discontinuous transmission DTX state and a non-DTX state, the valid HARQ state is the non-DTX state, and the non-DTX state is a HARQ state that is sent by the second device and that is detected by the first device. According to the method provided in this embodiment of this application, after the DTX state is excluded, the non-DTX state is selected as the valid HARQ state, so that the valid HARQ state is more accurate.

In a possible design, the at least two HARQ states are carried in at least two downlink time units, and the valid HARQ state is a HARQ state carried in an earliest downlink time unit in the at least two downlink time units. Therefore, according to the method provided in this embodiment of this application, the valid HARQ state can be easily determined.

In a possible design, when the at least two HARQ states each are carried in HARQ feedback information sent by the second device, the valid HARQ state is the HARQ state carried in the earliest downlink time unit in the at least two downlink time units. According to the method provided in this embodiment of this application, after a HARQ state carried in scheduling information is excluded, the HARQ state carried in the earliest downlink time unit in the HARQ states carried in the HARQ feedback information is selected as the valid HARQ state, so that the valid HARQ state is more accurate.

In a possible design, when the at least two HARQ states are respectively carried in HARQ feedback information sent by the second device and scheduling information sent by the second device, and a HARQ state carried in the HARQ feedback information is different from a HARQ state carried in the scheduling information, the valid HARQ state is the HARQ state carried in the HARQ feedback information. According to the method provided in this embodiment of this application, when the HARQ state carried in the HARQ feedback information is different from the HARQ state carried in the scheduling information, after the HARQ state carried in the scheduling information is excluded, the HARQ state carried in the HARQ feedback information is selected as the valid HARQ state, so that the valid HARQ state is more accurate.

In a possible design, the at least two HARQ states include an acknowledgment ACK state, and the valid HARQ state is the ACK state. Therefore, according to the method provided in this embodiment of this application, the ACK state is selected as the valid HARQ state, so that the valid HARQ state is more accurate.

In a possible design, the at least two HARQ states each are obtained by the first device after the reference time unit.

In a possible design, a time interval between any one of at least one time unit that carries the at least two HARQ states and the reference time unit is not less than a first preset time interval.

In a possible design, the any time unit is after the reference time unit.

In a possible design, when the at least two HARQ states are carried in at least two time units, the valid HARQ state is a HARQ state carried in at least one earliest time unit in the at least two time units, and the at least one earliest time unit carries a same HARQ state.

In a possible design, when the at least two HARQ states include a default state and a non-default state, the valid HARQ state is the non-default state.

In a possible design, when the at least two HARQ states are carried in the at least two time units, the first device determines that the valid HARQ state is a non-DTX state carried in an earliest uplink time unit in the at least two time units, and the non-DTX state is a HARQ state that is sent by the second device and that is detected by the first device.

According to a second aspect, an embodiment of this application provides an apparatus for adjusting a contention window size, configured to perform the method in the first aspect or any possible design of the first aspect. Specifically, the apparatus includes a module configured to perform the method in the first aspect or any possible design of the first aspect.

According to a third aspect, an embodiment of this application provides a device for adjusting a contention window size, including a transceiver and a processor. The processor is configured to perform the method in the first aspect or any possible design of the first aspect.

According to a fourth aspect, an embodiment of this application provides a communications system, including the first device and the second device in the first aspect.

According to a fifth aspect, this application provides a computer-readable storage medium. The computer-readable storage medium stores an instruction, and when the instruction is run on a computer, the computer is enabled to perform the method in the first aspect or any possible design of the first aspect.

According to a sixth aspect, this application further provides a computer program product including an instruction. When the computer program product is run on a computer, the computer is enabled to perform the method in the first aspect or any possible design of the first aspect.

DESCRIPTION F EMBODIMENTS

The following describes the embodiments of this application with reference to accompanying drawings.

A long term evolution (LTE) system uses an orthogonal frequency division multiplexing (OFDM) technology, and a minimum resource unit used for data transmission is a resource element (RE). The resource element is corresponding to one OFDM symbol in time domain and one subcarrier in frequency domain. Based on this, a resource block (RB) includes a plurality of consecutive OFDM symbols in time domain and a plurality of contiguous subcarriers in frequency domain, and is a basic unit of resource scheduling. During LTE uplink transmission, a single carrier is used. One RE is corresponding to one single carrier frequency division multiple access (SC-FDMA) symbol and one subcarrier in frequency domain, uplink resource allocation in the LTE system is performed at a granularity of a transmission time interval (TTI), and a length of one TTI is 14 OFDM symbols, namely, one subframe with a length of 1 ms.

Figure 1:
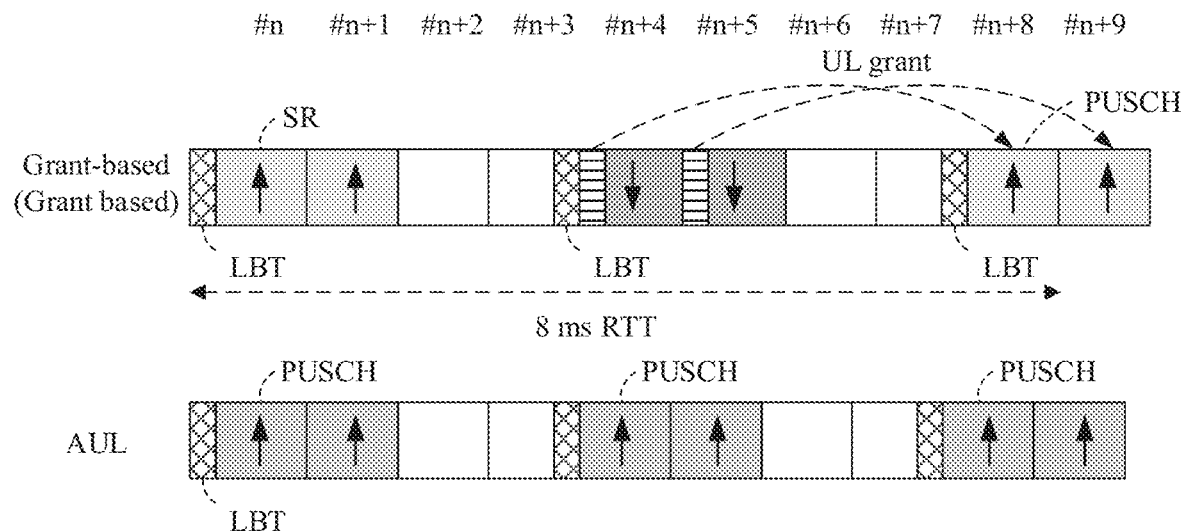
FIG. 1 is a schematic diagram of uplink transmission in an LTE system according to an embodiment of this application.

Referring to FIG. 1, uplink transmission in the LTE system is scheduled by a network device, to be specific, the network device instructs, by using an uplink grant (UL grant) included in a downlink control channel, a terminal device or user equipment (UE) to send an physical uplink shared channel (PUSCH) in a corresponding uplink subframe. Specifically, if the terminal device needs to send uplink data, the terminal device needs to first send a scheduling request (SR) to the network device on an uplink control channel (PUCCH), to wait for the network device to send the UL grant for scheduling the PUSCH to the terminal device after receiving the SR, and then sends the uplink data on an uplink resource scheduled by using the UL grant.

Because the terminal device needs to send the SR and wait for the UL grant scheduling of the network device before sending the PUSCH, during the conventional uplink transmission based on the UL grant scheduling, there is a relatively great delay, and a channel may fail to be preempted because LBT is performed for a plurality of times. To reduce a delay and more efficiently use uplink resources, grant-free uplink (GUL) transmission that is also referred to as autonomous uplink (AUL) transmission may be performed. The network device semi-statically configures or indicates a GUL resource to one or at least two terminal devices, and activates the GUL transmission. If the terminal device has an uplink service requirement, the terminal device does not need to send an SR, but may directly send uplink data on the GUL resource, so as to reduce a delay caused by sending an SR and waiting for a UL grant.

For a GUL-based system, to help the network device to feed back a receiving state for a GUL PUSCH, an uplink HARQ-ACK feedback for an uplink data channel is introduced, and is carried in HARQ feedback information. Specifically, the HARQ feedback information may be G-DCI. For a manner of feeding back a HARQ state in the HARQ feedback information, the HARQ feedback information includes indication information used to indicate whether a previous transmission performed by the terminal device by using at least one HARQ process is correctly received, but does not include scheduling information used by the network device to schedule the terminal device to perform initial transmission or retransmission by using the HARQ process.

As an example rather than a limitation, the HARQ feedback information may also be used to feed back a HARQ state for another uplink data channel in addition to the GUL PUSCH.

Figure 2:
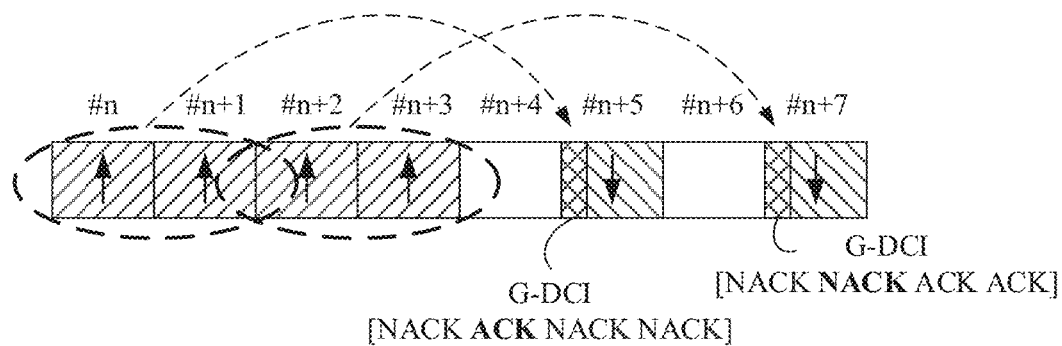
FIG. 2 is a schematic diagram of receiving, by a terminal device when HARQ feedback information is G-DCI, the G-DCI sent by a network device according to an embodiment of this application.

Specifically, in the HARQ feedback information, a receiving state of each HARQ process in a HARQ process set is indicated through bit mapping. For example, an ACK is represented by "1" in binary, and a NACK is represented by "0" in binary. When the HARQ process set includes HARQ processes corresponding to HARQ IDs {#0, #1, #2, #3}, if #0 and #1 indicate correct receiving, and #2 and #3 indicate incorrect receiving, a bit map included in the HARQ feedback information is {1, 1, 0, 0}. In the HARQ feedback information based on bit mapping, each HARQ process identifier included in the HARQ feedback information has a default state, for example a NACK state. When the network device sends the HARQ feedback information, if the network device does not need to feed back a HARQ state for a specific HARQ process (for example, the network device does not detect that the terminal device sends a data packet by using the HARQ process), it indicates that the HARQ process is in a default state (which may be represented by a NACK). Alternatively, after feeding back, by using the HARQ feedback information, a HARQ state for a HARQ process corresponding to a specific detected data channel, the network device may reset the HARQ state corresponding to the HARQ process to a default state. As shown in FIG. 2, the HARQ feedback information is G-DCI, and the HARQ process set includes #H0, #H1, #H2, and #H3. The terminal device respectively sends uplink data information in subframes #n to #n+3 by using #H0 to #H3. The network device feeds back HARQ states [H0: NACK, H1: ACK, H2: NACK, H3: NACK] for #H0, #H1, #H2 and #H3 in G-DCI in #n+5, and HARQ states of #H2 and #H3 are default states. The network device feeds back HARQ states [NACK, NACK, ACK, ACK] for #H2 and #H3 in G-DCI in #n+7, and the HARQ state of #H1 is reset to a default state NACK in the G-DCI in n+7.

When the terminal device adjusts an uplink CWS based on the HARQ feedback information, if two consecutive pieces of HARQ feedback information are inconsistent because a default state is reset, how the terminal device adjusts the CWS based on the HARQ feedback information is a problem that needs to be urgently resolved in the embodiments of this application.

Similar to uplink CWS adjustment, when downlink HARQ information fed back by the terminal device is based on bit mapping, because the downlink HARQ information is also based on bit mapping, and each HARQ process identifier included in the downlink HARQ information has a default state such as a NACK state, at least two pieces of downlink HARQ information received by the network device are inconsistent because a default state is reset. In this case, how the network device adjusts the CWS based on the downlink HARQ information is a problem that needs to be urgently resolved in the embodiments of this application.

Main network elements used in the embodiments of this application include the network device and the terminal device that can work on an unlicensed spectrum. The network device includes a macro base station, a micro cell, a pico cell, a home base station, a remote radio head, a relay, and the like. The terminal device includes a mobile phone, a laptop computer that can access the LTE system, a tablet computer, and the like.

The embodiments of this application is applicable to a wireless communications system that can work on an unlicensed spectrum, and includes but is not limited to systems such as Multefire 1.0, Multefire 1.1, Multefire 2.0, FeLAA, and 5G NR. At least one of a network device and a terminal device in the wireless communications system sends information on the unlicensed spectrum. For example, the network device sends downlink information on the unlicensed spectrum, and correspondingly, the terminal device sends uplink information on a licensed spectrum or the unlicensed spectrum. Alternatively, the terminal device sends uplink information on the unlicensed spectrum, and correspondingly, the network device sends downlink information on a licensed spectrum or the unlicensed spectrum.

Figure 3:
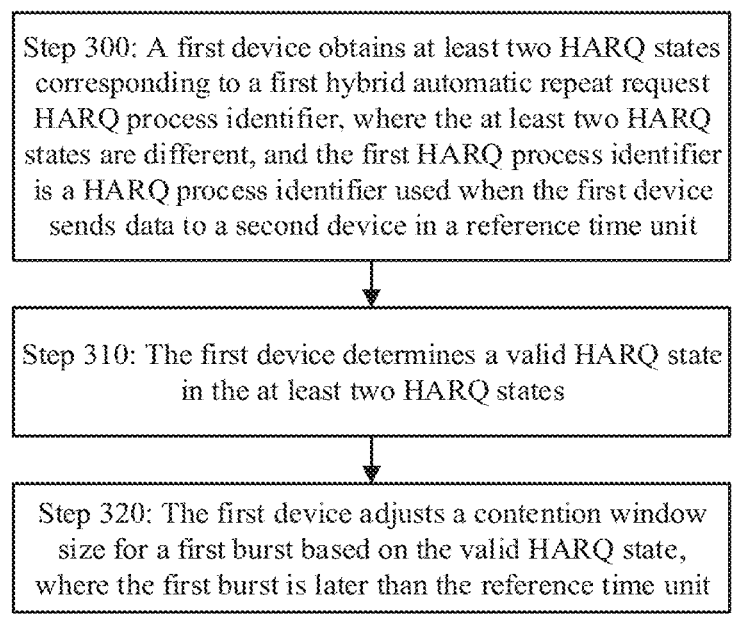
FIG. 3 is an overview flowchart of a method for adjusting a contention window size according to an embodiment of this application.

Referring to FIG. 3, an embodiment of this application provides a method for adjusting a contention window size. The method includes the following steps:

Step 300: A first device obtains at least two HARQ states corresponding to a first HARQ process identifier, where the at least two HARQ states are different, and the first HARQ process identifier is a HARQ process identifier used when the first device sends data to a second device in a reference time unit.

Step 310: The first device determines a valid HARQ state in the at least two HARQ states.

Step 320: The first device adjusts a contention window size for a first burst based on the valid HARQ state, where the first burst is later than the reference time unit.

It should be understood that, in this embodiment of this application, after the first device successfully performs LIST on an unlicensed spectrum, the first device may continuously occupy a channel, in other words, the first device may transmit data in consecutive time units. Data transmission that is sent by the first device by occupying the channel after the first device successfully performs LBT is referred to as a burst. Specifically, the first burst includes at least one time unit, and the at least one time unit may be consecutive, or may be inconsecutive. For downlink transmission, the at least one time unit may be referred to as a downlink burst (DL Burst), and for uplink transmission, the at least one time unit may be referred to as an uplink burst (UL Burst). That the at least one time unit may be consecutive means that sequence numbers of time units (for example, TTIs or subframes) are consecutive. In addition, there may be or may not be a gap between any two adjacent time units included in the first burst. To be specific, the first device does not occupy a time domain resource at the end of the former time unit or a time domain resource at the start of the latter time unit, but reserves the time domain resource as "idle". This is not limited in this embodiment of this application.

In a possible design, the first burst may be a downlink burst, and the downlink burst may be at least one time unit occupied by a network device (for example, a base station) or a cell served by the network device after preempting an unlicensed frequency band resource. Specifically, the downlink burst includes at least one consecutive downlink time unit, and one downlink burst and any other downlink burst or any other uplink burst are inconsecutive.

In a possible design, the first burst may be an uplink burst, and the uplink burst may be at least one time unit occupied by a terminal device after preempting an unlicensed frequency band resource. Specifically, the uplink burst includes at least one consecutive uplink time unit, and one uplink burst and any other downlink burst sent by a network device or any other uplink burst sent by the terminal device are inconsecutive.

It should be understood that the first device performs LBT based on the contention window size (CWS), and occupies the channel to send the first burst after completing the LBT. In this case, the CWS is referred to as the CWS for the first burst.

For step 300, the at least two HARQ states each are obtained by the first device after the reference time unit, in other words, time units that carry the at least two HARQ states each are after the reference time unit. In addition, the time units that carry the at least two HARQ states each are before a moment at which the first device determines the CWS. Because the first device has sent uplink information by using the first HARQ process identifier in another time unit before the reference time unit, and has obtained a HARQ state of the another time unit, the HARQ state of the another time unit apparently should not be included in the at least two different HARQ states.

In addition, it should be further understood that the reference time unit is a latest time unit occupied when the first device sends, by using the first HARQ process identifier, the data information to the second device before the first device determines the CWS. Alternatively, the first device does not send the data between the reference tune unit and the first burst by using the first HARQ process identifier.

It should be noted that, in this embodiment of this application, the reference tune unit includes at least one consecutive TTI, in other words, the reference time unit may be one TTI, or may be a plurality of consecutive TTIs. Each TTI included in the reference time unit may be a complete TTI (to be specific, the first device occupies all time domain resources corresponding to the TTI to send information), or may be a partial TTI. For example, for the partial TTI, the first device occupies only some time domain resources instead of the other time domain resources of a complete TTI. For another example, compared with the complete TTI, the first device reserves a time domain resource at the start of the TTI as "idle" (in other words, the first device does not occupy the time domain resource at the start of the TTI), or reserves a time domain resource at the end of the TTI as "idle". For another example, one downlink reference time unit may include the first two TTIs of a downlink burst. The first TTI is a partial TTI, and the network device occupies a time domain resource in the middle of the first TTI to a time domain resource at the end of the first TTI. The second TTI is a complete TTI.

It should be understood that the TTI may be a 1 ms TTI that is also referred to as a subframe with a length of 1 ms, or may be an sTTI shorter than 1 ms that is referred to as a mini-slot. A length of a time domain resource occupied by the sTTI is shorter than that of the 1 ms TTI, in other words, when a TTI corresponding to a specific data channel is an sTTI, a length of a time domain resource occupied by the TTI is shorter than 1 ms. For uplink transmission, the TTI is a time domain granularity for uplink resource allocation or uplink transmission, or the TTI is a minimum time domain unit used by the terminal device to perform uplink transmission. An optional length of the sTTI that may be supported includes seven SC-FDMA symbols (SS), one SS, two SSs, three SSs, four SSs, or the like. For downlink transmission, the TTI is a time domain granularity for downlink resource allocation or downlink transmission, or the TTI is a minimum time domain unit used by the network device to perform downlink transmission. An optional length of the sTTI that may be supported includes seven OFDMA symbols (OS), one OS, two OSs, three OSs, four OSs, or the like. Another TTI length shorter than 1 ms of the sTTI is further supported.

It should be understood that the first device determines the reference time unit, and adjusts the CWS for the first burst based on the obtained HARQ states for the first HARQ process identifier. The first HARQ process identifier is the HARQ process identifier used when the first device sends the data information in the reference time unit.

In a possible design, the reference time unit is a time unit in a burst that is before the first burst and that has a same type as the first burst.

It should be understood that the first device may send data information by using the reference time unit, and the first device may send at least one of data information, control information, or a reference signal by using the first burst. It should be understood that the same-type burst means that uplink and downlink transmission directions are the same. For example, when the first burst is an uplink burst, the reference time unit is a time unit in an uplink burst before the uplink burst. When the first burst is a downlink burst, the reference time unit is a time unit in a downlink burst before the downlink burst.

In a possible design, when the first device is a network device, and the second device is a terminal device, the reference time unit is a downlink reference time unit. The downlink reference time unit determined by the network device is a downlink time unit in a latest downlink burst (referred to as a second downlink burst) before the first burst, and the network device expects to receive at least a HARQ state that is fed back by the terminal device for the downlink reference time unit (in other words, in a HARQ feedback time sequence, the terminal device can demodulate data information in the reference time unit and feed back the HARQ state, which is described below). Specifically, the downlink reference time unit is the first downlink time unit in the second downlink burst.

In a possible design, when the first device is a network device, and the second device is a terminal device, the reference time unit is an uplink reference time unit. In this case, the reference time unit is determined by the terminal device based on received downlink control information used to indicate a HARQ state corresponding to an uplink data packet. Specifically, the downlink control information is before the first burst in terms of time.

In addition, it should be understood that the reference time unit is an uplink time unit in an uplink burst (referred to as a second uplink burst) before a time unit (for example, a downlink time unit that carries the downlink control information) in which the terminal device receives the downlink control information. More specifically, the reference time unit is the first uplink time unit in the second uplink burst. In addition, the second uplink burst is an uplink burst sent when the terminal device accesses a channel through random backoff-based CCA. Moreover, the terminal device sends uplink data information UL-SCH in the reference time unit, in other words, an uplink time unit that is scheduled by the network device but is not sent by the terminal device because the terminal device does not access the channel due to an LBT failure cannot be used as the reference time unit.

In addition, it should be understood that the second uplink burst is a latest uplink burst before a target time unit, and a time interval between the target time unit and the downlink time unit that carries the downlink control information is a first predefined time interval. For example, if the downlink control information is a UL grant, the downlink time unit in which the UL grant is received is a subframe #n, and the first predefined time interval is 3 ms, the second uplink burst is a latest uplink burst before a subframe #n−3.

In addition, it should be understood that the downlink control information includes two types: scheduling information and HARQ feedback information. Specifically, the scheduling information includes a UL grant. Specifically, the HARQ feedback information includes uplink HARQ feedback information based on bit mapping, for example, G-DCI. When being to determine the reference time unit based on the received downlink control information, the terminal device may determine the reference time unit based on the received scheduling information, or may determine the reference time unit based on the received feedback information.

In a possible design, a time interval between any one of at least one time unit that carries the at least two HARQ states and the reference time unit is not less than a first preset time interval. Specifically, the any time unit is after the reference time unit and before the first burst. Considering a delay of decoding a data packet by the network device or the terminal device and a delay of packaging HARQ information by the network device or the terminal device, a HARQ state fed back by the second device for the reference time unit can be sent after a period of time. Specifically, a shortest time interval between the time unit that carries the HARQ state and the reference time unit is the first preset time interval. More specifically, the first preset time interval is k time units, k>0, and k is an integer. For example, for downlink transmission, when the reference time unit is a subframe #n, the terminal device can feed back the HARQ state for the reference time unit in a subframe #n+k at the earliest time. For uplink transmission, when the reference time unit is a subframe #n, the network device can feed back the HARQ state for the reference time unit in a subframe #n+k at the earliest time. A HARQ state fed back in a subframe earlier than the subframe #n+k is definitely not a HARQ state feedback for the reference time unit, and therefore is not included in the at least two HARQ states. Therefore, the at least two HARQ states in the present invention each are a HARQ state in which the second device can demodulate data information in the reference time unit and that is fed back, in a HARQ feedback time sequence, in other words, a time interval between any time unit that carries the at least two HARQ states and the reference time unit is greater than or equal to a first preset time interval.

For example, it is assumed that the first preset time interval is k subframes, and k>0. When the reference time unit is the subframe in, the first device can obtain the HARQ state corresponding to the first HARQ process identifier in the subframe #n+k at the earliest time, and a HARQ state carried in a subframe earlier than the subframe #n+k is not a HARQ feedback for the reference time unit. Therefore, the at least two HARQ states each are a HARQ state that is carried in a subframe after the subframe #n+k and that is corresponding to the first HARQ process identifier.

It should be understood that the first device may determine the reference time unit after receiving the at least two HARQ states, or may determine the reference time unit before receiving the at least two HARQ states. For example, for uplink data transmission, after receiving the downlink control information, the terminal device determines the reference time unit based on the downlink control information. For example, for downlink data transmission, a moment at which the terminal sends the HARQ information is indicated by the network device, and the network device may expect a moment at which the HARQ information is received. Therefore, a moment at which the network device determines the downlink reference time unit may be before a moment at which the at least two HARQ states are received, or may be after a moment at which the at least two HARQ states are received. This is not limited it should be understood that the HARQ state is also referred to as a receiving state or a HARQ receiving state.

It should be understood that any HARQ state (namely, the HARQ state) of the at least two HARQ states is specifically a value of the HARQ state corresponding to the first HARQ process identifier, for example, an ACK, a NACK, or DTX. Therefore, the HARQ state is not specifically corresponding to a specific time unit. The HARQ state is carried in at least one time unit, in other words, HARQ information carried in each of the at least one time unit is corresponding to the HARQ state. Optionally, the HARQ state may be carried in one time unit. For example, if the second device feeds back, only in one time unit, HARQ information corresponding to the first HARQ process identifier, a HARQ state corresponding to the HARQ information is the HARQ state. Optionally, the HARQ state may be carried in at least two time units, in other words, HARQ information carried in each of the at least two time units is corresponding to the HARQ state. For example, if the second device feeds back, in two time units, two pieces of HARQ information corresponding to the first HARQ process identifier, and both HARQ states corresponding to the two pieces of HARQ information are NACKs, the HARQ state is a NACK, and the HARQ state is carried in the two time units.

It should be understood that, when the HARQ state is carried in at least one time unit, the HARQ state is also referred to as a HARQ state corresponding to HARQ information carried in any one of the at least one time unit. Specifically, when the HARQ state may be carried in one time unit, the HARQ state is a HARQ state corresponding to HARQ information in the time unit. When the HARQ state is carried in at least two time units, the HARQ state is a HARQ state corresponding to HARQ information in any one of the at least two tune units.

It should be understood that, when the at least two HARQ states are carried in the at least two time units, a quantity of the at least two time units is greater than or equal to a quantity of the at least two HARQ states. For example, three pieces of HARQ information received by the first device in three time units are respectively (chronologically) corresponding to an ACK, a NACK, and a NACK, and the at least two HARQ states include two states: the ACK and the NACK, and are carried in the three time units. In this case, a HARQ state carried in an earliest time unit is the ACK. For another example, three pieces of HARQ information received by the first device in three time units are respectively (chronologically) corresponding to an ACK, an ACK, and a NACK, and the at least two HARQ states include two states: the ACK and the NACK, and are carried in the three time units. In this case, a HARQ state carried in an earliest time unit is the ACK.

It should be understood that the at least two time units each may be an uplink time unit or a downlink time unit. The foregoing features are also applicable to the following scenario in which the at least two HARQ states are carried in at least two uplink time units and the following scenario in which the at least two HARQ states are carried in at least two downlink time units.

It should be understood that, that the at least two HARQ states are different means that any one of the at least two HARQ states is different from any other of the at least two HARQ states. For example, the at least two HARQ states are two different HARQ states: an ACK and a NACK. For another example, the at least two HARQ states are three different HARQ states: an ACK, a NACK, and DTX.

It should be understood that the at least two HARQ states each may be carried on an unlicensed spectrum or some of the at least two HARQ states may be carried on an unlicensed spectrum, and the other HARQ states may be carried on a licensed spectrum; or the at least two HARQ states each may be carried on a licensed spectrum.

It should be noted that, when a specific HARQ process identifier is corresponding to at least two transport blocks, in other words, when the first device performs transmission by using a plurality of codewords, the second device may feed back two pieces of HARQ information for the HARQ process identifier, and each piece of HARQ information is corresponding to one codeword or one transport block thereof. When HARQ states of the at least two transport blocks are different, for example, a HARQ state corresponding to one transport block is an ACK, and a HARQ state corresponding to another transport block is a NACK, the HARQ process identifier are also corresponding to at least two different HARQ states. It should be understood that the at least two HARQ states mentioned in this embodiment of this application do not include different HARQ states of at least two different codewords or transport blocks for a same HARQ process identifier.

Optionally, the first HARQ process identifier is corresponding to one transport block, or the first HARQ process identifier is corresponding to data transmission based on a single codeword (also referred to as a single transport block).

When the first device performs transmission by using a single codeword, each HARQ process identifier is corresponding to only one transport block. Therefore, the at least two HARQ states are different because the at least two HARQ states are carried in different time units or different pieces of control information, and a valid HARQ state may be determined in the at least two HARQ states.

Optionally, any HARQ states in the at least two HARQ states are corresponding to a same transport block, and the transport block is corresponding to the first HARQ process identifier.

When the first device performs transmission by using a plurality of codewords, the at least two HARQ states are limited to being corresponding to a same transport block. Therefore, the at least two HARQ states are different because the at least two HARQ states are carried in different time units or different pieces of control information. It should be understood that, that the at least two HARQ states are corresponding to the same transport block in the first HARQ process identifier means that the at least two HARQ states each are carried in a field corresponding to the same transport block in the HARQ information. For example, the first device sends two transport blocks: a TB#1 and a TB#2 by using the first HARQ process identifier, and successively obtains two pieces of HARQ information for the first HARQ process identifier. In this case, corresponding states are {TB#1: ACK, TB#2: NACK} and {TB#1: NACK, TB#2: NACK}. Therefore, the at least two different HARQ states each are the HARQ state corresponding to TB#1.

For step 310, for a specific scenario in which the first device is a network device, the second device is a terminal device, and the first HARQ process identifier is a HARQ process identifier for the second device and a specific scenario in which the first device is a terminal device, the second device is a network device, and the first HARQ process identifier is a HARQ process identifier corresponding to the first device, the following separately describes how to determine a valid HARQ state in the at least two HARQ states.

Scenario 1: The first device is a network device, the second device is a terminal device, and the first HARQ process identifier is a HARQ process identifier for the second device.

Optionally, any one of the at least two HARQ states corresponding to the first HARQ process identifier includes an acknowledgement ACK and a negative acknowledgement NACK.

For example, when the terminal device determines that a specific data packet (or a downlink HARQ process corresponding to the data packet) is correctly received, the terminal device feeds back, to the network device, that a HARQ state corresponding to the downlink HARQ process identifier is an ACK. When the terminal device determines that the data packet is incorrectly received, the terminal device feeds back, to the network device, that the HARQ state corresponding to the downlink HARQ process identifier is a NACK. Alternatively, when the terminal device does not detect a downlink data channel on which the downlink data packet is located, the terminal device feeds back, to the network device, that the HARQ state corresponding to the downlink HARQ process identifier is a NACK, in other words, the NACK is used to indicate that the downlink data channel or a downlink HARQ process corresponding to the downlink data channel is not detected.

Optionally, any one of the at least two HARQ states corresponding to the first HARQ process identifier includes an ACK state, a NACK state, or a discontinuous transmission (DTX) state.

It should be understood that a time unit in which the terminal device feeds back the HARQ information is indicated by the network device, and the terminal device may send or may not send the HARQ information by occupying a channel in the time unit indicated by the network device. When the network device does not detect, in a time unit in which the terminal device is expected to send the HARQ information, the HARQ information sent by the terminal device, the HARQ state is a DTX state, and the DTX is also referred to a corresponding HARQ state when the network device does not detect that the terminal device sends the HARQ information by occupying the channel. When the network device detects, in a time unit in which the terminal device is expected to send the HARQ information, a HARQ state sent by the terminal device, the HARQ state is a non-DTX state, and the non-DTX state is also referred to a HARQ state when the network device detects that the terminal device sends the HARQ information by occupying the channel. For example, the non-DTX state may include an ACK or a NACK.

That the network device determines that the HARQ state corresponding to the first HARQ process identifier is the DTX state specifically includes the following two possible cases:

Case 1: After the network device notifies the terminal device of a time unit for feeding back the HARQ information, the terminal device does not send the HARQ information in the time unit because the terminal device does not preempt the channel due to an LBT failure.

In this case, the terminal device sends the HARQ information on a channel that is first preempted subsequently, and the HARQ information still includes the HARQ state corresponding to the first HARQ process identifier. For example, when a receiving state of a data packet corresponding to the first HARQ process identifier in the reference time unit is an ACK, the terminal device cannot send, due to an LBT failure, the HARQ information in the time unit that is for feeding back the HARQ information and that is notified by the network device, and the network device does not detect, in the expected time unit, the HARQ state sent by the terminal device, so as to determine that the HARQ state corresponding to the first HARQ process identifier is DTX. When the terminal device successfully performs LBT for a next time unit for feeding back the HARQ information, and preempts the channel, the terminal device sends the HARQ information. In this case, the HARQ information includes the HARQ state corresponding to the first HARQ process identifier, namely, an ACK. After that, if there is a time unit for subsequently feeding back the HARQ information, the HARQ information fed back by the terminal device includes the HARQ state that is corresponding to the first HARQ process identifier and that is reset to a default state (NACK).

Case 2: The terminal device possibly does not detect a downlink data channel of the network device, or possibly does not detect a DL grant in the reference time unit. Therefore, the terminal device determines that the HARQ information does not need to be fed back. The network device does not detect, in the expected time unit, the HARQ state sent by the terminal device, and determines that the HARQ state corresponding to the first HARQ process identifier is DTX. In this case, the DTX is a real HARQ state corresponding to the first HARQ process identifier. In addition, even if there is a time unit for subsequently feeding back the HARQ information, the HARQ information fed back by the terminal device includes the HARQ state corresponding to the first HARQ process identifier, namely, a default state (NACK).

Figure 4:
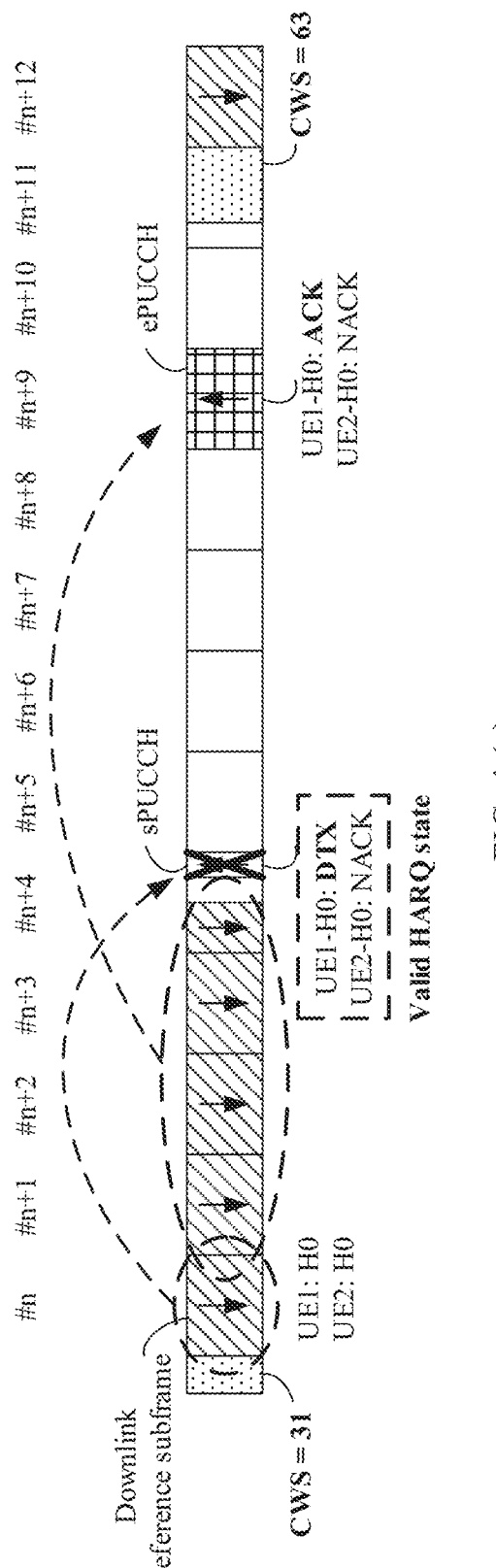
FIG. 4(a) is a first schematic diagram of a DTX state corresponding to downlink data transmission according to an embodiment of this application.
FIG. 4(b) is a second schematic diagram of a DTX state corresponding to downlink data transmission according to an embodiment of this application.
Figure 4:
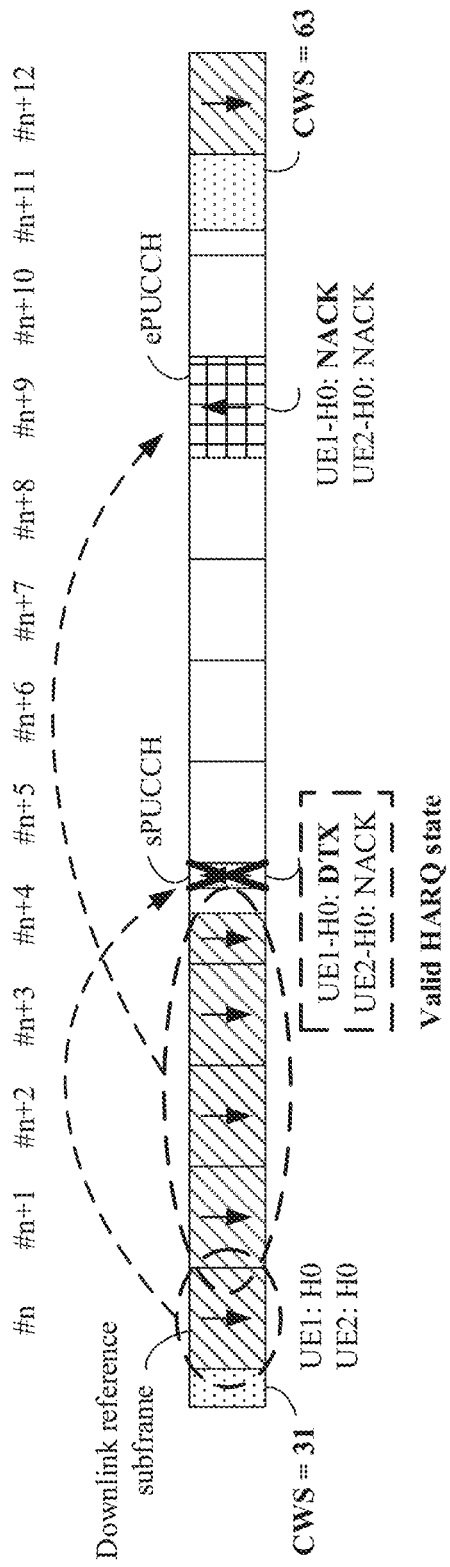

For example, as shown in FIG. 4(a) and FIG. 4(b), the network device sends a downlink burst in subframes #n to #n+4, and the reference time unit is the subframe #n. The network device schedules UE 1 (by using #H0) and UE 2 (by using #H0) in the reference time unit, and the first HARQ process identifier is #H0 of the UE 1. The network device instructs the UE 1 and the UE 2 to feed back HARQ information on an sPUCCH of the subframe #n+4 and an ePUCCH of a subframe #n+9.

In FIG. 4(a), it is assumed that the UE 1 correctly demodulates #H0, and the UE 2 incorrectly demodulates #H0. The UE 1 does not occupy the sPUCCH due to art LBT failure. Therefore, the network device does not detect, on the sPUCCH of the subframe #n+4, a HARQ state sent by the UE 1, and determines that the HARQ state corresponding to the first HARQ process identifier is DTX. Because the UE successfully performs LBT in the subframe #n+9 and occupies the ePUCCH, the UE 1 feeds back the HARQ information. In this case, a HARQ state of #H0 of the UE 1 that is carried in the HARQ information is an ACK. FIG. 4(a) is corresponding to the foregoing case 1.

In FIG. 4(b), it is assumed that the UE 1 does not detect a DL grant in the subframe #n, and the UE 2 incorrectly demodulates #H0. Therefore, the UE 1 does not send the HARQ information in the subframe #n+4 because the UE 1 does not detect a new HARQ process. Therefore, the network device does not detect, on the sPUCCH of the subframe #n+4, a HARQ state sent by the UE 1, and determines that the HARQ state corresponding to the first HARQ process identifier is DTX. Because the UE 1 detects a DL grant in subframes #n+1 to #n+3, the UE 1 feeds bake the HARQ information on an ePUCCH of the subframe #n+9. In this case, a HARQ state of M0 of the UE 1 that is carried in the HARQ information is a NACK. FIG. 4(b) is corresponding to the foregoing case 2.

In addition, the network device detects, in the expected time unit, the HARQ state sent by the terminal device, in other words, the non-DTX state is carried in the HARQ information fed back by the terminal device to the network device. Specifically, the HARQ information includes a data packet sent by the network device, or a HARQ process identifier corresponding to the data packet, or a transport block (TB, Transport Block), or a HARQ state corresponding to a data channel. The HARQ information is control information that carries at least one HARQ state including the HARQ state corresponding to the first HARQ process identifier. Alternatively, the HARQ information is a bit domain or a bit location that carries the HARQ state corresponding to the first HARQ process identifier. Specifically, when the first HARQ process is a downlink HARQ process, the HARQ information corresponding to the first HARQ process is uplink control information (also referred to as HARQ-ACK information) that is carried on an uplink control channel (sPUCCH/ePUCCH) or an uplink data channel (PUSCH) and that is used to indicate a HARQ state of at least one downlink HARQ process identifier including the first HARQ process identifier. For example, the uplink control information includes a HARQ state based on bit mapping, and each HARQ bit location is corresponding to one downlink HARQ process identifier. Alternatively, the HARQ information is a bit location that is in the uplink control information and that is used to indicate the HARQ state corresponding to the first HARQ process identifier.

With reference to the scenario 1, this embodiment of this application provides the following possible implementations of determining the valid HARQ state in the at least two HARQ states.

Manner 1-1: The at least two HARQ states are carried in at least two uplink time units, and the valid HARQ state is a HARQ state carried in an earliest uplink time unit in the at least two uplink time units.

Specifically, a reason that the valid HARQ state is the HARQ state carried in the earliest uplink time unit in the at least two uplink time units is as follows: The HARQ state carried in the earliest uplink time unit truly reflects a receiving state of data information corresponding to the first HARQ process identifier in the reference time unit. Because a subsequent HARQ state may be reset to a default state, the HARQ state may not truly reflect the receiving state of the data information. Therefore, a valid state should be a HARQ state carried in an earliest uplink time unit.

Figure 5:
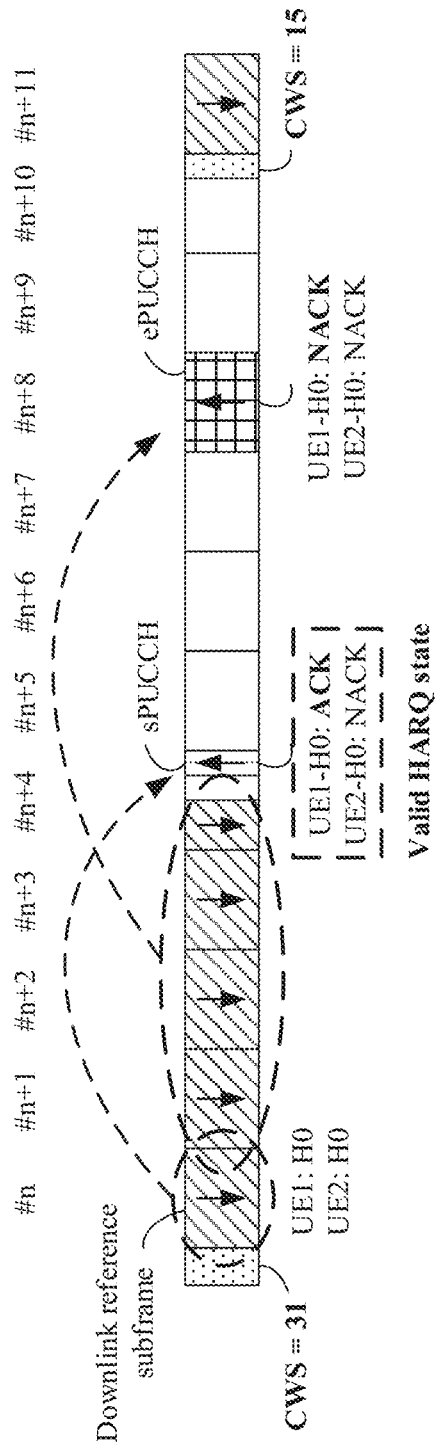
FIG. 5 is a schematic diagram of a non-DTX state corresponding to downlink data transmission according to an embodiment of this application.

As shown in FIG. 5, the network device sends a downlink burst in subframes #n to #n+4, and the reference time unit is the subframe #n. The network device schedules UE 1 (by using #H0) and UE 2 (by using #H0) in the reference time unit, and the first HARQ process identifier is #H0 of the UE 1. The UE 1 correctly demodulates #H0, and the UE 2 incorrectly demodulates #H0. The network device instructs the UE 1 and the UE 2 to feed back HARQ information on an sPUCCH of the subframe #n+4 and an ePUCCH of a subframe #n+8, and the HARQ information includes a HARQ state based on bit mapping. The UE 1 feeds back the HARQ information on the sPUCCH of the subframe #n+4, and a HARQ state of #H0 of the UE 1 that is carried in the HARQ information is an ACK. When the UE 1 feeds back the HARQ information again on the ePUCCH of #n+8, a HARQ state of the UE 1 that is carried in the HARQ information is reset to a NACK. Therefore, the valid HARQ state is the HARQ state carried in the earliest uplink time unit in the at least two uplink time units, namely, the HARQ state of #H0 of the UE 1 that is carried in the HARQ information fed back by the UE 1 on the sPUCCH of the subframe #n+4: the ACK.

It should be understood that, that a HARQ state corresponding to any one of the at least two uplink time units is DTX (in other words, the network device does not detect that the terminal device sends the HARQ information in the any time unit) is also referred to as that the HARQ state carried in the any time unit is the DTX.

As shown in FIG. 4(a), two different HARQ states corresponding to the first HARQ process identifier are respectively DTX and an ACK, and are respectively carried in two uplink time unit subframes #n+4 and #n+9. The network device may determine, in the manner 1-1, that the valid. HARQ state is a HARQ state carried in an earlier uplink time unit in the two uplink time units, namely, DTX.

As shown in FIG. 4(b), two different HARQ states corresponding to the first HARQ process identifier are respectively DTX and a NACK, and are respectively carried in two uplink time unit subframes #n+4 and #n+9. The network device may determine, in the manner 1-1, that the valid HARQ state is a HARQ state carried in an earlier uplink time unit in the two uplink time units, namely, DTX.

It should be understood that the time unit that carries the HARQ information is indicated by the network device. In the manner 1-1, the HARQ state carried in the earliest uplink time unit in the at least two uplink time units is a HARQ state that is earliest obtained from a perspective of the first device, or a HARQ state that is expected to be earliest obtained from a perspective of the first device. The HARQ state may be carried in earliest HARQ information that is fed back by the second device for the first HARQ process identifier corresponding to the reference time unit, or may not be carried in earliest HARQ information that is fed back by the second device for the first HARQ process identifier corresponding to the reference time unit. For example, when the second device does not send the HARQ information (DTX) in an earliest time unit expected by the first device, but sends the HARQ information in a later time unit, the first device still considers that the earliest obtained HARQ state is the DTX state (instead of a HARQ state corresponding to HARQ information that is actually earliest sent by the second device).

Therefore, the manner 1-1 is characterized by easy implementation.

However, in the manner 1-1, when the at least two HARQ states corresponding to the first HARQ process identifier include DTX, and the DTX is the HARQ state carried in the earliest uplink time unit in the at least two uplink time units, the valid state is the DTX in the manner 1-1 regardless of a subsequent HARQ state carried in the time unit. If the DTX is caused by the case 1, to be specific, the terminal device fails to perform LBT, and the terminal device successfully performs LBT for the next time unit for feeding back the HARQ information succeeds, and preempts the channel, when the network device is to send the ACK state, the network device may incorrectly increase the CWS because the network device incorrectly records the actual ACK state corresponding to the reference time unit as the DTX.

To resolve the foregoing problem that the actual ACK state corresponding to the reference time unit is incorrectly recorded as the DTX, the network device may exclude the DTX state and then select a HARQ state carried in an earliest uplink time unit as the valid HARQ state.

In other words, the network device determines that the valid HARQ state is a non-DTX state carried in an earliest uplink time unit. Specifically, the earliest uplink time unit is an earliest time unit in at least two time units that carry the at least two HARQ states. It should be understood that the non-DTX state is any HARQ state other than the DTX state. Further, the non-DTX state may be either of an ACK and a NACK. For example, three pieces of HARQ information received by the first device in three time units for the first HARQ process identifier are respectively (chronologically) corresponding to DTX, an ACK, and a NACK, and the valid HARQ state is the ACK. In this case, a HARQ state carried in an earliest time unit is the ACK. For another example, two pieces of HARQ information received by the first device in two time units for the first HARQ process identifier are respectively (chronologically) corresponding to DTX and a NACK. In this case, a HARQ state carried in an earliest time unit is the NACK.

Manner 1-2: When the at least two HARQ states each are a HARQ state that is sent by the second device and that is detected by the first device, the valid HARQ state is a HARQ state carried in an earliest uplink time unit in the at least two uplink time units. That the first device detects the HARQ state sent by the second device is also referred to as that the network device detects the HARQ state sent by the terminal device by occupying the channel. Specifically, the first device detects that the HARQ state sent by the second device is a non-DTX state. More specifically, the first device detects that the HARQ state sent by the second device includes an ACK state and a NACK state. As described above, to avoid the disadvantages of the manner 1-1, a DIX state may be excluded, the at least two HARQ states are limited to non-DTX states, and an earliest HARQ state is determined in the non-DTX states as the valid HARQ state. For example, when a receiving state of the first HARQ process in the reference time unit is an ACK, the terminal device cannot send, due to an LBT failure, the HARQ information in an earliest time unit that carries the HARQ information. If LBT for a next time unit that carries the HARQ information succeeds and the channel is occupied, a HARQ state corresponding to the earliest time unit is DTX. If a HARQ state corresponding to the next time unit is an ACK, and the valid HARQ state is an ACK.

In other words, when the network device obtains the DTX state and the at least two non-DTX states for the first HARQ process identifier, the DTX may be excluded, and the at least two HARQ states are limited to the non-DTX states.

Optionally, the at least two HARQ states each are a HARQ state that is sent by the second device and that is detected by the first device, the at least two HARQ states are carried in the at least two uplink time units, and the valid HARQ state is the HARQ state carried in the earliest uplink time unit in the at least two uplink time units.

In addition, the manner 1-2 may alternatively be performed only when the network device obtains at least two non-DTX states but obtains no DTX state for the first HARQ process identifier.

As shown in FIG. 5, the network device sends a downlink burst in subframes #n to #n+4, and the reference time unit is the subframe #n. The network device schedules UE 1 (by using #H0) and UE 2 (by using #H0) in the reference time unit, and the first HARQ process identifier is #H0 of the UE 1. The UE 1 correctly demodulates #H0, and the UE 2 incorrectly demodulates #H0. The network device instructs the UE 1 and the UE 2 to teed back HARQ information on an sPUCCH of the subframe #n+4 and an ePUCCH of a subframe #n+8, and the HARQ information includes a HARQ state based on bit mapping. The UE 1 feeds back the HARQ information on the sPUCCH of the subframe #n+4, and a HARQ state of #H0 of the UE 1 that is carried in the HARQ information is an ACK. When the UE 1 feeds back the HARQ information again on the ePUCCH of #n+8, a HARQ state of the UE 1 that is carried in the HARQ information is reset to a NACK. The at least two HARQ states each are a HARQ state that is sent by the terminal device and that is detected by the network device, and are respectively an ACK and a HACK. The network device may determine, in the manner 1-2, that the valid HARQ state is the HARQ state carried in the earliest uplink time unit in the at least two uplink time units, namely, the HARQ state of #H0 of the UE 1 that is carried in the HARQ information fed back by the UE 1 on the sPUCCH of the subframe #n+4: the ACK.

It should be understood that, in the manner 1-2, when the at least two HARQ states each are a HARQ state that is sent by the second device and that is detected by the first device, the valid HARQ state is the HARQ state carried in the earliest uplink time unit in the at least two uplink time units, in other words, the valid HARQ state is a HARQ state, in the at least two HARQ states, that is corresponding to the first HARQ process identifier and that is carried in HARQ information earliest received by the first device. Specifically, the first device detects that the HARQ state sent by the second device is a non-DTX state.

Therefore, the HARQ state carried in the earliest uplink time unit in the at least two uplink time units is a HARQ state corresponding to HARQ information that is earliest received from a perspective of the first device. The HARQ information may be earliest HARQ information fed back by the second device for the first HARQ process identifier corresponding to the reference time unit, or may not be earliest HARQ information fed back by the second device for the first HARQ process identifier corresponding to the reference time unit. For example, the first device does not detect the earliest HARQ information (including a real HARQ state of the first HARQ process identifier corresponding to the reference time unit) fed back by the second device, but detects, as the earliest HARQ information, subsequent HARQ information (the HARQ state corresponding to the first HARQ process identifier has been reset to a default state) fed back by the second device. In this case, because the first device cannot perform determining, the valid HARQ state is the default state. It should be understood that the foregoing description is also applicable to a scenario 2 (a manner 2-1, a manner 2-2, and a manner 2-3).

Therefore, the manner 1-2 is characterized by the following: The manner 1-2 is slightly more complex than the manner 1-1, but the valid HARQ state determined in the manner 1-2 is more accurate than that determined in the manner 1-1.

For the manner 1-1 and the manner 1-2, it should be understood that, if the first K (K>1) time units in the at least two uplink time units all carry a same HARQ state, the valid HARQ state is the same HARQ state. In other words, the valid HARQ state is HARQ states carried in the earliest K time units in the at least two uplink time units, where K is a positive integer, and the HARQ states carried in the K time units are the same.

Specifically, that the valid HARQ state is the HARQ state carried in the earliest uplink time unit in the at least two uplink time units means that the valid HARQ state is the same as the HARQ state carried in the earliest uplink time unit in the at least two uplink time units. This application does not impose a limitation on whether the valid HARQ state is determined based on HARQ information, in an earliest time unit, that is fed back by the second device and that is received by the first device. In some cases, the second device repeatedly sends a same HARQ state in at least two time units, so as to improve reliability of HARQ information transmission. In this case, the HARQ state obtained by the first device in the earliest uplink time unit is the same as a HARQ state obtained by the first device in a later uplink time unit. Specifically, when the HARQ state that is corresponding to the first HARQ process identifier and that is carried in the HARQ information, where the HARQ information is fed back by the second device in the later time unit and received by the first device, is the same as the HARQ state that is corresponding to the first HARQ process identifier and that is carried in the earliest HARQ information (in other words, the second device repeatedly sends a same HARQ state for the first HARQ process identifier in a plurality of pieces of HARQ information), the first device may also determine the valid HARQ state based on the HARQ information fed back in the later uplink time unit. However, because the valid HARQ state is the same as the HARQ state in the HARQ information in the earliest uplink time unit, the valid HARQ state is still referred to as the HARQ state carried in the earliest uplink time unit. It should be understood that the foregoing description is also applicable to the scenario 2 (for example, the manner 2-1 and the manner 2-2). When the at least two HARQ states are carried in at least two downlink time units, the first device may determine the HARQ state based on HARQ information in an earliest time unit, or may determine the HARQ state based on HARQ information in a later time unit. In this case, the valid HARQ state is a HARQ state carried in an earliest downlink time unit in the at least two downlink time units.

In other words, when the at least two HARQ states are carried in the at least two time units, the valid HARQ state is a HARQ state carried in at least one earliest time unit in the at least two time units, and the at least one earliest time unit carries a same HARQ state. The at least two time units each are an uplink time unit (for the scenario 1), or the at least two time units each are a downlink time unit (for the scenario 2).

Figure 6:
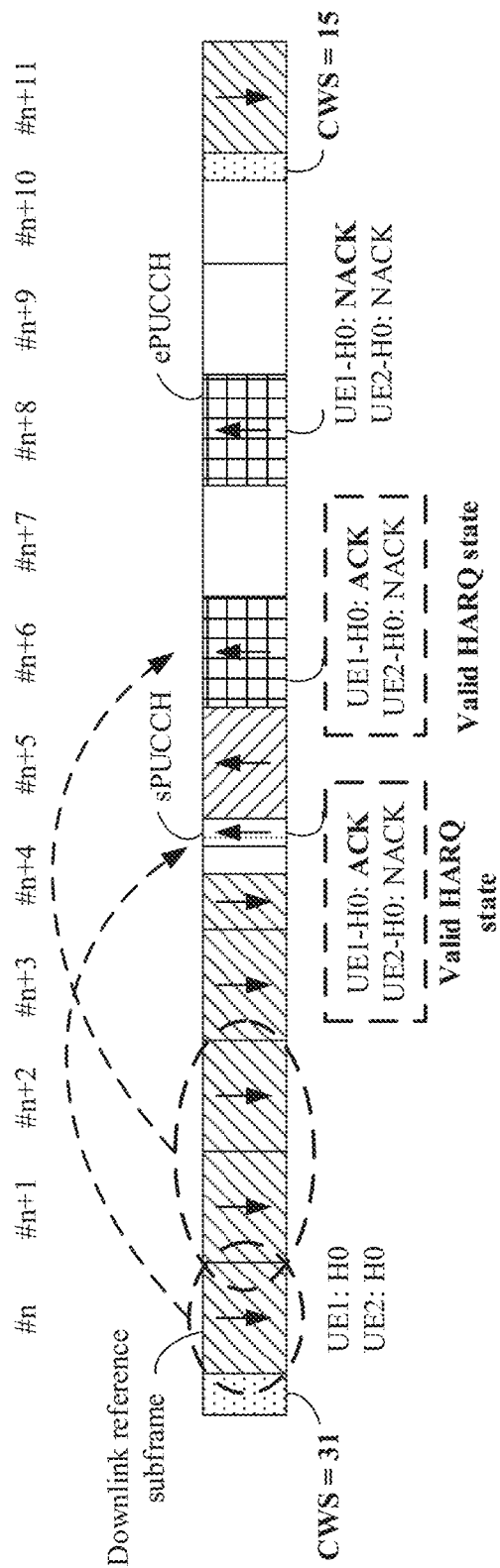
FIG. 6 is a schematic diagram of repeatedly sending a same HARQ state within a same burst in downlink data transmission according to an embodiment of this application.

As shown in FIG. 6, the network device sends a downlink burst in subframes #n to #n+4, and the reference time unit is the subframe #n. The network device schedules UE 1 (by using #H0) and UE 2 (by using #H0) in the reference time unit, and the first HARQ process identifier is #H0 of the UE 1. The UE 1 correctly demodulates #H0, and the UE 2 incorrectly demodulates #H0. The network device instructs the UE 1 and the UE 2 to feed back HARQ information on an sPUCCH of the subframe #n+4 and ePUCCHs of subframes #n+6 and #n+8, and the HARQ information includes a HARQ state based on bit mapping. The UE 1 feeds back the HARQ information on the sPUCCH of the subframe #n+4, and a HARQ state of #H0 of the UE 1 that is carried in the HARQ information is an ACK. To ensure reliability of HARQ information transmission, a HARQ state of #H0 of the UE 1 that is carried in the HARQ information fed back by the UE 1 on the ePUCCH of the subframe #n+6 is still an ACK and not reset to a NACK. A HARQ state of #H0 of the UE 1 that is carried in the HARQ information fed back by the UE 1 on the ePUCCH of the subframe #n+8 is reset to a NACK. Therefore, a valid HARQ state of #H0 of the UE 1 is a same HARQ state carried on the sPUCCH corresponding to the subframe #n+4 and the ePUCCH corresponding to the subframe #n+6, namely, the ACK.

Manner 1-3: When the at least two HARQ states include a non-DTX state and a DTX state, the valid HARQ state is the non-DTX state, and the non-DTX state is a HARQ state that is sent by the second device and that is detected by the first device. To exclude the DTX state when the valid HARQ state is to be determined, the valid HARQ state may also be determined as the non-DTX state when the at least two HARQ states include the DTX state and the non-DTX state.

Figure 7:
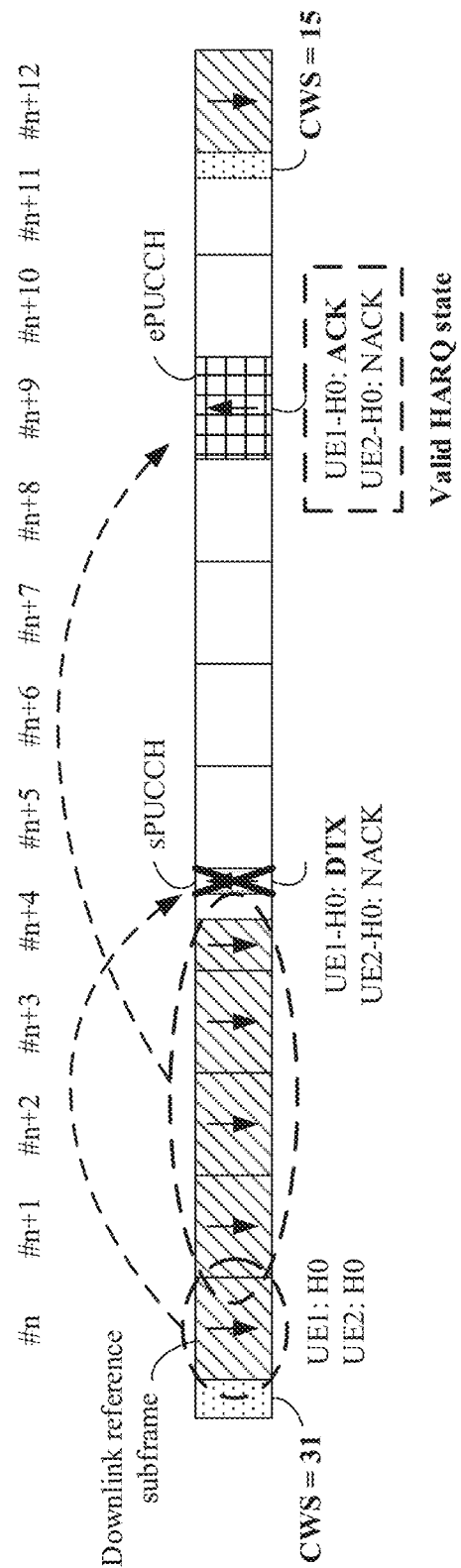
FIG. 7(a) is a third schematic diagram of a DTX state corresponding to downlink data transmission according to an embodiment of this application.
FIG. 7(b) is a fourth schematic diagram of a DTX state corresponding to downlink data transmission according to an embodiment of this application.
Figure 7:
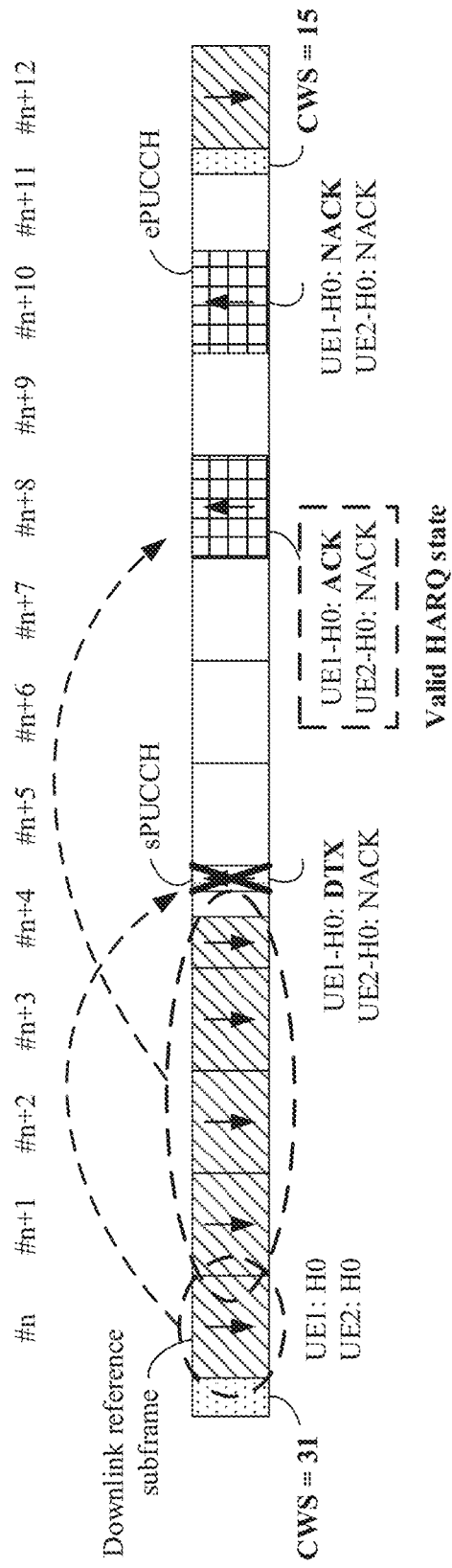

As shown in FIG. 7(a), similar to FIG. 4(a), two different HARQ states corresponding to the first HARQ process identifier are respectively DTX and an ACK, and are respectively carried in two uplink time unit subframes #n+4 and #n+9. The network device may determine, in the manner 1-3, that the valid HARQ state is the non-DTX state, namely, the ACK.

As shown in FIG. 4(b), two different HARQ states corresponding to the first HARQ process identifier are respectively DTX and a NACK, and are respectively carried in two uplink time unit subframes #n+4 and #n+9. The network device may determine, in the manner 1-3, that the valid HARQ state is the non-DTX state, namely, the NACK.

Therefore, compared with the manner 1-2 in which the valid HARQ state is determined in two non-DTX states, the manner 1-3 is characterized by the following: When the two different HARQ states include one DIX state and one non-DTX state, the network device may directly determine the valid HARQ state in the manner 1-3 without waiting for the two different non-DTX states to determine the valid HARQ state in the manner 1-2. Therefore, the manner 1-3 is easier and more efficient.

Optionally, when the at least two HARQ states include a DTX state and one non-DTX state (also referred to as a HARQ state that is sent by the terminal device and that is detected by the network device), the valid HARQ state is the non-DTX state. In other words, the at least two HARQ states include only two different HARQ states, one is the DTX state, and the other is the non-DTX state. In this case, the non-DTX state is selected as the valid HARQ state. More specifically, the non-DTX state may be an ACK or a NACK.

Optionally, when the at least two HARQ states include a DTX state and at least one non-DTX state (also referred to as a HARQ state that is sent by the second device and that is detected by the first device), the valid. HARQ state is one of the at least one non-DTX state. When the at least one non-DIX state includes only one non-DTX state (for example, an ACK or a NACK), the valid HARQ state is the non-DTX state. When the at least one non-DTX state includes at least two non-DTX states (for example, an ACK and a NACK), the valid HARQ state is one of the at least two non-DTX states. Further, when the at least two non-DTX states are carried in at least two uplink time units, the valid HARQ state is anon-DTX state carried in an earliest uplink time unit in the at least two uplink time units.

In addition, when the network device obtains a DTX state and at least two different non-DTX states for the first HARQ process identifier, the network device may also determine the valid HARQ state in the manner 1-2, in other words, the at least two HARQ states are limited to the at least two different non-DTX states. As shown in FIG. 7(b), the network device instructs the UE 1 and the UE 2 to feed back the HARQ information on an sPUCCH of a subframe #n+4 and ePUCCHs of subframes #n+8 and #n+10, and the HARQ information includes a HARQ state based on bit mapping. The first HARQ process identifier is 410 of the UE 1. The UE 1 does not occupy the sPUCCH due to an LBT failure, and the network device determines that the HARQ state corresponding to the first HARQ process identifier on the sPUCCH of the subframe #n+4 is the DTX. If the UE 1 successfully performs LBT, and occupies the ePUCCHs of #n+8 and #n+10, a HARQ state carried on the ePUCCH of #n+8 is an ACK, and a HARQ state carried on the ePUCCH of #n+10 is reset to a NACK. In this case, in the manner 1-2, the network device excludes the DTX of #n+4, limits the at least two different HARQ states to the ACK of #n+8 and the NACK of #n+10, and determines the valid HARQ state, namely, the HARQ state carried on the ePUCCH of #n+8: the ACK.

Scenario 2: The first device is a terminal device, the second device is a network device, and the first HARQ process identifier is a HARQ process identifier corresponding to the first device.

A HARQ state corresponding to an uplink HARQ process identifier is an ACK or a NACK.

For example, if the network device determines that a specific data packet or an uplink HARQ process corresponding to the data packet is correctly received, the network device feeds back, to the terminal device, that a HARQ state corresponding to the uplink HARQ process identifier is an ACK. Alternatively, if the network device determines that the data packet (or the uplink HARQ process corresponding to the data packet) is incorrectly received, the network device feeds back, to the terminal device, that the HARQ state corresponding to the uplink HARQ process identifier is a NACK. Alternatively, if the network device does not detect the data packet (or the uplink HARQ process corresponding to the data packet), the network device feeds back, to the terminal, that the HARQ state corresponding to the uplink HARQ process identifier is a NACK, in other words, the NACK is used to indicate that the data packet or the uplink HARQ process corresponding to the data packet is not detected.

The network device feeds back, to the terminal device, that the HARQ state corresponding to the uplink HARQ process identifier is carried in the HARQ information. When the first HARQ process identifier is an uplink HARQ process, the HARQ information corresponding to the first HARQ process identifier is downlink control information that is carried on a downlink control channel and that is used to indicate a HARQ state of at least one downlink HARQ process including the first HARQ process identifier. The HARQ information may be corresponding to two types that are respectively HARQ feedback information and scheduling information. The HARQ information may be the HARQ feedback information, or may be the scheduling information. The HARQ information may alternatively be a field that is in the HARQ feedback information and that is used to indicate a HARQ state, or the HARQ information may be a field that is in the scheduling information and that is used to indicate a HARQ state.

The HARQ feedback information includes indication information used to indicate whether a previous uplink transmission corresponding to a specific HARQ process identifier is correctly received by the network device, but does not include scheduling information used by the network device to schedule the terminal device to perform initial transmission or retransmission by using the HARQ process identifier. Optionally, the HARQ feedback information includes a HARQ state corresponding to each HARQ process identifier in an uplink HARQ process identifier set (including at least one HARQ process identifier). The uplink HARQ process identifier set may be configured by the network device, or may be predefined. Specifically, in the HARQ feedback information, the HARQ state corresponding to each HARQ process identifier in the uplink HARQ process identifier set is indicated through bit mapping. Specifically, the uplink HARQ process identifier set includes the first HARQ process identifier.

In addition, as described above, in the HARQ feedback information based on bit mapping, each HARQ process identifier included in the HARQ feedback information has a default state. Specifically, the default state is a NACK. Details are not described herein again.

Further, the HARQ feedback information may be G-DCI.

Optionally, the HARQ feedback information is a bit location that is in the G-DCI and that is used to indicate the HARQ state corresponding to the first HARQ process identifier.

Alternatively, the HARQ information is scheduling information, for example, a UL grant, or the HARQ information is a field that is in the UL grant and that is used to indicate a HARQ state, for example, a new data indicator (New Data Indicator, NDI) field.

The scheduling information is used to instruct the terminal device to use the HARQ state corresponding to the first HARQ process identifier, and includes transmission format information used to schedule the terminal device to perform initial transmission or retransmission by using the first HARQ process identifier. The transmission format information includes frequency domain resource information, time domain resource information, a modulation and coding scheme (MCS), power information, an uplink pilot, or control information that is corresponding to scheduled uplink transmission, for example, at least one of a sounding reference signal (SRS), and/or a demodulation reference symbol (DMRS), and/or channel state information (CSI), and/or a DL HARQ request, and a precoding matrix indicator (PMI). Specifically, the scheduling information may be a UL grant.

Optionally, the scheduling information is a bit location that is in the UL grant and that is used to indicate a HARQ state, namely, an NDI.

Optionally, by using the UL grant as an example, the scheduling information may indicate, by using one of the following methods, the HARQ state corresponding to the first HARQ process identifier. This is merely an example and does not constitute a limitation on this embodiment of this application.

Method 1: Distinguishing is performed through scrambling. When the UL grant is a dynamic UL grant scrambled by using a first RNTI (for example, a C-RNTI), regardless of whether a value of an NDI indicated by the UL grant scrambled by using the C-RNTI is 0 or 1, it indicates that the HARQ state corresponding to the first HARQ process identifier is an ACK. When the UL grant is a semi-static UL grant scrambled by using a second RNTI (for example, an SPS C-RNTI or a GUL C-RNTI), and a value of an NDI indicated by the UL grant is a preset value such as 1, it indicates that the HARQ state corresponding to the first HARQ process identifier is a NACK. It should be noted that the first RNTI is different from the second RNTI. It should be understood that GUL transmission may be performed through semi-static resource allocation. When the NDI carried in the semi-static UL grant is equal to 0, the NDI is used to activate/reactivate the GUL transmission. When the NDI carried in the semi-static UL grant is equal to 1, the NDI is used to schedule the terminal device to perform single retransmission.

Method 2: Distinguishing is performed by using an NDI. When the NDI carried in the UL grant is toggled with a previous transmission corresponding to the first HARQ process identifier, namely, an NDI corresponding to a data packet sent by the terminal device in the reference time unit by using the first HARQ process identifier, it indicates that the terminal device is scheduled to perform initial transmission by using the first HARQ process identifier, and the terminal device considers that the HARQ state corresponding to the first HARQ process identifier in the reference time unit is an ACK. If the NDI carried in the UL grant is not toggled with a previous transmission corresponding to the first HARQ process identifier, it indicates that the terminal device is scheduled to perform retransmission by using the first HARQ process identifier, and the terminal device considers that the HARQ state corresponding to the first HARQ process identifier in the reference time unit is a NACK.

With reference to the scenario 2, this embodiment of this application provides the following possible implementations of determining the valid HARQ state in the at least two HARQ states.

Manner 2-1: The at least two HARQ states are carried in at least two downlink time units, and the valid HARQ state is a HARQ state carried in an earliest downlink time unit in the at least two downlink time units.

Similar to the manner 1-1 in the scenario 1, considering the HARQ feedback information based on bit mapping, when the network device feeds back a plurality of HARQ states for the first HARQ process identifier, the HARQ state carried in the earliest uplink time unit truly reflects a receiving state of data information corresponding to the first HARQ process identifier in the reference time unit. Because a subsequent HARQ state may be reset to a default state HARQ state may not truly reflect the receiving state of the data information.

It should be understood that, in the manner 2-1, the valid HARQ state is the HARQ state corresponding to the HARQ information carried in an earliest downlink time unit in the at least two downlink time units, and a type corresponding to the HARQ information is not limited. For example, the HARQ information may be corresponding to the HARQ feedback information, or may be corresponding to the scheduling information.

Figure 8:
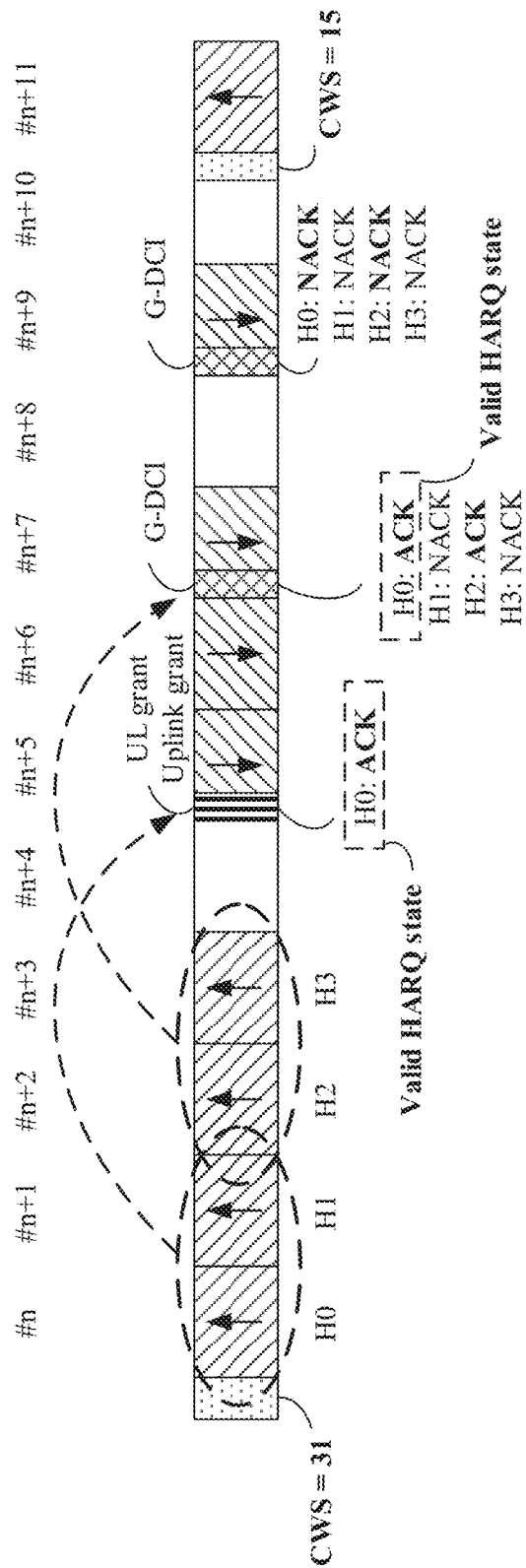
FIG. 8 is a schematic diagram of repeatedly sending a same HARQ state within a same burst in uplink data transmission according to an embodiment of this application.

As shown in FIG. 8, the terminal device sends an uplink burst in subframes #n to #n+3 that are respectively corresponding to HARQ processes #H0 to #H3. The reference time unit is the subframe #n, and the first HARQ process identifier is #H0. The network device sends, in a subframe #n+5, an initial transmission (ACK) in which #H0 is scheduled by using the UL grant, feeds back G-DCI in a subframe #n+7, including a HARQ state corresponding to #H0 in the subframe #n: an ACK, feeds back the G-DCI in a subframe #n+9, and resets the HARQ state corresponding to #H0 to a HACK.

The terminal device determines that the valid HARQ state is the HARQ state carried in the earliest downlink time unit in the at least two downlink time units, namely, the HARQ state that is corresponding to #H0 and that is carried in the UL grant received in the subframe #n+5: the ACK.

In addition, any HARQ feedback information and any scheduling information may be separately carried in different time units, or may be carried in a same time unit. When the any HARQ feedback information and the any scheduling information are carried in a same downlink time unit, and the time unit is an earliest downlink time unit, the valid HARQ state may be a HARQ state corresponding to the any HARQ feedback information, or may be a HARQ state corresponding to the any scheduling information.

It should be understood that any two pieces of HARQ feedback information are carried in two different time units.

However, the HARQ states that are for the first HARQ process identifier and that are obtained by the terminal device may be separately carried in the HARQ feedback information and the scheduling information, and a HARQ state corresponding to the HARQ feedback information is different from a HARQ state corresponding to the scheduling information. For example, when the network device does not detect an uplink data packet (referred to as a data packet #1) sent by the terminal device by using the first HARQ process identifier, and schedules, by using the foregoing method 1, the terminal device to send an initially transmitted data packet (referred to as a data packet #2) by using the first HARQ process identifier, the terminal device may incorrectly consider that the scheduling information is an ACK for the data packet #1, in other words, the terminal device incorrectly considers that a state that is not detected is the ACK. Therefore, the HARQ feedback information is more reliable. For example, in the foregoing example, because the network device does not detect the data packet #1, the network device sets the HARQ state corresponding to the first HARQ process identifier to a default NACK state. Therefore, when the HARQ state corresponding to the HARQ feedback information is different from the HARQ state corresponding to the scheduling information, the HARQ state carried in the scheduling information may be excluded, and then an earliest HARQ state is determined in the HARQ states carried in the HARQ feedback information to serve as the valid. HARQ state.

In other words, the terminal device determines that the valid HARQ state is the HARQ state carried in the HARQ feedback information in the earliest downlink time unit. Specifically, the earliest uplink time unit is an earliest time unit in the at least two time units that carry the at least two HARQ states and that are obtained by the terminal device.

Manner 2-2: When the at least two HARQ states each are carried in HARQ feedback information sent by the second device, the valid HARQ state is the HARQ state carried in the earliest downlink time unit in the at least two downlink time units.

It should be understood that, when the HARQ state carried in the scheduling information is different from the HARQ state carried in the HARQ feedback information, the HARQ state carried in the scheduling information may be excluded, the at least two HARQ states are limited to the HARQ state carried in the HARQ feedback information, and an earliest HARQ state is determined in at least two HARQ states carried in the HARQ feedback information to serve as the valid HARQ state.

Similar to the manner 1-2 in the scenario 1, it should be understood that, because the terminal device possibly obtains the HARQ feedback information by performing blind detection on a downlink control channel region, the HARQ state carried in the earliest downlink time unit is actually a HARQ state corresponding to earliest HARQ feedback information detected or received by the terminal device.

Figure 9:
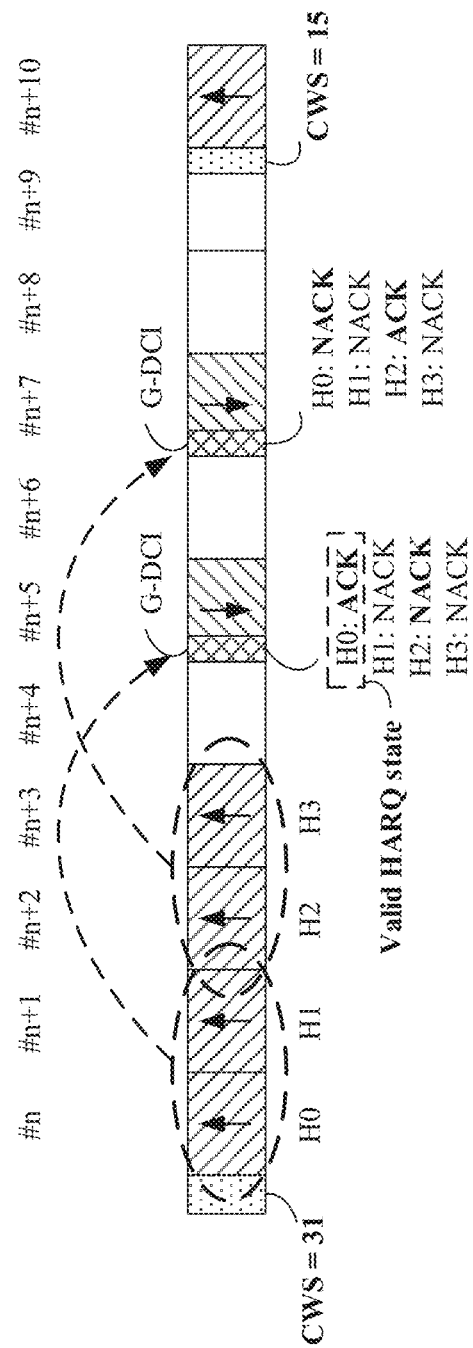
FIG. 9 is a schematic diagram of a valid HARQ state corresponding to uplink data transmission according to an embodiment of this application.

As shown in FIG. 9, the terminal device sends an uplink burst in subframes #n to #n+3 that are respectively corresponding to HARQ processes #H0 to #H3. The reference time unit is the subframe #n, and the first HARQ process identifier is #H0. The network device feeds back G-DCI in a subframe #n+5, including an actual HARQ state ACK corresponding to in the subframe #n, an actual HARQ state NACK corresponding to #H1 in the subframe #n+1, and default states NACKs corresponding to #H2 and #H3 in the subframe #n+1. The network device feeds back G-DCI in a subframe #n+7, including an actual HARQ state ACK corresponding to #H2 in the subframe #n+2, an actual HARQ state NACK corresponding to #H3, and default states NACKs corresponding to #H0 and #H1 in the subframe #n+3. The terminal device correctly detects the G-DCI in the subframe #n+5 and the G-DCI in the subframe #n+7. The terminal device determines that two different HARQ states corresponding to the first HARQ process identifier #H0 are an ACK and a NACK, and both are carried in the HARQ feedback information sent by the network device. The terminal device may determine, in the manner 2-2, that the valid HARQ state is the HARQ state carried in the earliest downlink time unit in the two downlink time units, namely, the HARQ state corresponding to #H0 in the G-DCI in the subframe #n+5: the ACK.

Similar to the scenario 1, it should be understood that, for the manner 2-1 and the manner 2-2, if the first K (K>1) time units in the at least two downlink time units all carry a same HARQ state, the valid HARQ state is the same HARQ state, which is described in the manner 1-1 in the scenario 1. In other words, the valid HARQ state is HARQ states carried in earliest K time units in the at least two downlink time units, where K is a positive integer, and the HARQ states carried in the K time units are the same. It should be understood that HARQ information that is in any one of the earliest K time units and that is used to carry a HARQ state may be corresponding to the HARQ feedback information, or may be corresponding to the scheduling information, in other words, a type corresponding to the HARQ information is not limited.

In other words, when the at least two HARQ states are carried in the at least two downlink time units, the valid HARQ state is a HARQ state carried in at least one earliest downlink time unit in the at least two downlink time units, and the at least one earliest downlink time unit carries a same HARQ state. The valid HARQ state is the same HARQ state. As shown in FIG. 8, two pieces of earliest HARQ information, namely, the UL grant in the subframe #n+5 and the G-DCI in the subframe #n+7, are corresponding to a same HARQ state. The terminal device determines that the valid HARQ state corresponding to #H0 is the same HARQ state corresponding to the UL grant and the G-DCI in the subframe #n+7, namely, an ACK.

Manner 2-3: When the at least two HARQ states are respectively carried in HARQ feedback information sent by the second device and scheduling information sent by the second device, and a HARQ state carried in the HARQ feedback information is different from a HARQ state carried in the scheduling information, the valid HARQ state is the HARQ state carried in the HARQ feedback information.

To exclude, when the valid HARQ state is to be determined, the HARQ state carried in the scheduling information, the HARQ state carried in the HARQ feedback information and the HARQ state carried in the scheduling information may be added to the at least two HARQ states, and when the HARQ state carried in the HARQ feedback information is different from the HARQ state carried in the scheduling information, the valid HARQ state is determined as the HARQ state carried in the HARQ feedback information.

It should be understood that the HARQ state carried in the scheduling information may be carried in at least one piece of scheduling information, but the at least one piece of scheduling information carries a same HARQ state.

It should be understood that the HARQ state carried in the HARQ feedback information may be carried in at least one piece of HARQ feedback information, but the at least one piece of HARQ feedback information carries a same HARQ state.

Optionally, when the at least two HARQ states include the HARQ state carried in the HARQ feedback information and the HARQ state carried in the scheduling information, and the HARQ state carried in the HARQ feedback information is different from the HARQ state carried in the scheduling information, the valid HARQ state is the HARQ state carried in the HARQ feedback information.

Optionally, when the at least two HARQ states include at least one HARQ state carried in the at least one piece of HARQ feedback information and the HARQ state carried in the scheduling information, and one of the at least one HARQ state carried in the at least one piece of HARQ feedback information is different from the HARQ state carried in the scheduling information, the valid HARQ state is one of the at least one HARQ state carried in the at least one piece of HARQ feedback information. Further, when the at least one piece of HARQ feedback information carries at least two different HARQ states, and the at least two different HARQ states are carried in at least two downlink time units, the valid HARQ state is a HARQ state carried in an earliest downlink time unit in the at least two downlink time units.

In addition, the terminal device learns that the HARQ state corresponding to the first HARQ process identifier includes the at least one HARQ state carried in the at least one piece of HARQ feedback information and the HARQ state carried in the scheduling information. When the at least one piece of HARQ feedback information carries the at least two different HARQ states, the terminal device may determine the valid HARQ state in the manner 2-2, in other words, the at least two HARQ states are limited to the HARQ state carried in the HARQ feedback information, and then an earliest HARQ state is determined in the at least two HARQ states carried in the HARQ feedback information to serve as the valid HARQ state.

Figure 10:
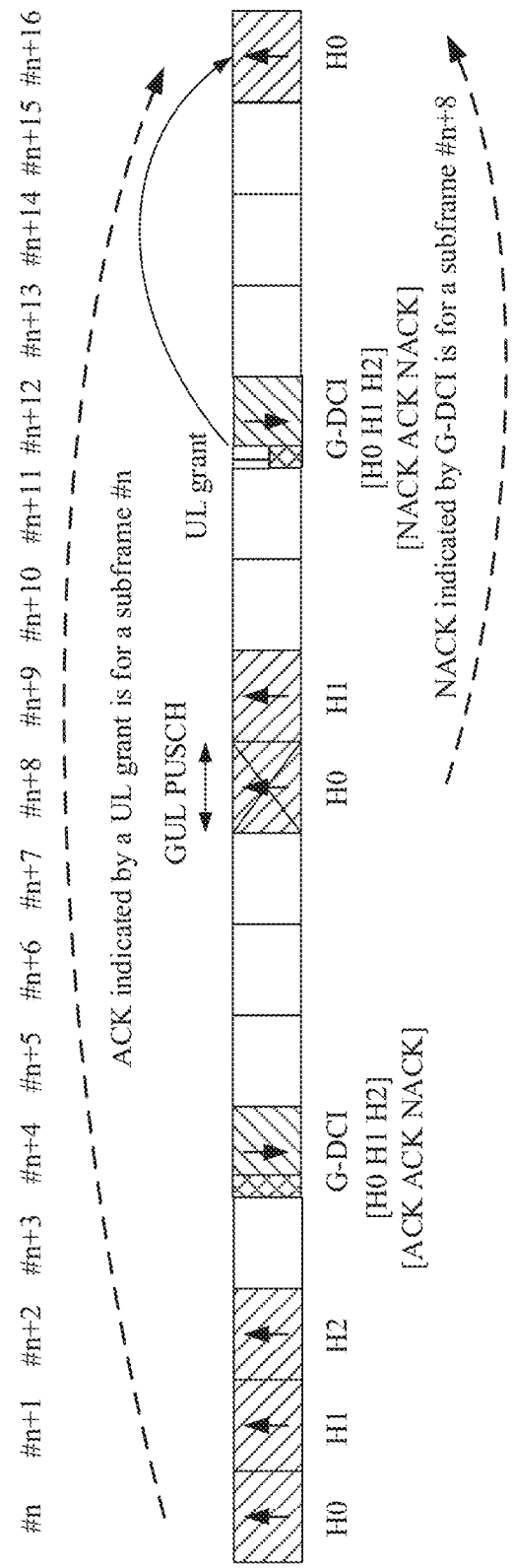
FIG. 10 is a schematic diagram in which a HARQ corresponding to a UL grant is inconsistent with a HARQ corresponding to G-DCI according to an embodiment of this application.

As shown in FIG. 10, the terminal device sends GUL transmission (GUL PUSCH) in #n+8 by using #H0, and the subframe #n+8 is the reference time unit. The network device does not detect GUL transmission corresponding to #H0, but detects GUL transmission corresponding to #H1 in a subframe #n+9, so as to feed back the G-DCI in a subframe #n+12. The G-DCI indicates that the HARQ state of #H0 in the subframe #n+8 is a default state NACK. In addition, the network device further sends, in the subframe #n+12, the UL grant to schedule the terminal device to perform initial transmission in a subframe #n+16 by using #H0. In this case, the UL grant indicates that the HARQ state of #H0 in the subframe #n+8 is an ACK. In this case, the HARQ state carried in the HARQ feedback information G-DCI is different from the HARQ state carried in the scheduling information UL grant. Therefore, the terminal device determines that the valid HARQ state is the HARQ state of #H0 in #n+8, namely, a NACK.

In addition, when the HARQ state carried in the HARQ feedback information is the same as the HARQ state carried in the scheduling information, as shown in FIG. 8, the terminal device may determine the valid HARQ state in the manner 2-1 and the manner 2-2.

Further, when the at least two HARQ states include an ACK state, the valid HARQ state is the ACK state. For the foregoing scenario 1 and scenario 2, a reason that the HARQ state is the NACK is that the previous HARQ state, namely, the ACK, is reset to the default state (NACK). When the HARQ state is the ACK, it definitely indicates that the data information corresponding to the first HARQ process identifier in the reference time unit is correctly received by the second device. Therefore, when the at least two HARQ states include the ACK state, the valid HARQ state is the ACK state.

In other words, when the at least two HARQ states include a default state and a non-default state, the valid HARQ state is the non-default state. The non-default state means that the HARQ state is the ACK, and the default state means that the HARQ state is the NACK.

As shown in FIG. 5, when the network device obtains two different HARQ states: the ACK in #n+4 and the NACK in the NACK is apparently the default state caused by resetting. The valid HARQ state is a non-default ACK state. As shown in FIG. 9, when the terminal device obtains two different HARQ states: the ACK in #n+5 and the NACK in #n+7, the valid HARQ state is similarly an ACK state.

For step 320, the first device needs to adjust the contention window size for the first burst based on the valid HARQ state with reference to the foregoing two scenarios.

It should be noted that, before the first device adjusts the CWS for the first burst based on the valid. HARQ state, the first device first initializes the CWS to an initial value. Each time the first device obtains the HARQ state for the data information in the reference time unit, the first device adjusts the CWS based on the HARQ state, and uses an adjusted CWS to perform channel sensing on a next burst based on random backoff CCA. Adjusting the CWS includes increasing the CWS, decreasing the CWS, or keeping the CWS unchanged. For example, when the HARQ state of the at least one HARQ process identifier in the reference time unit does not include the ACK state, or the NACK state accounts for a relatively large proportion, the CWS is increased; otherwise, the CWS is decreased.

Specifically, for the scenario 1, the network device schedules at least one terminal device in the reference time unit, and uses at least one HARQ process identifier for each of the at least one terminal device. Therefore, for all HARQ states that are obtained by the network device for all the foregoing terminal devices and that are corresponding to the reference time unit, when a NACK state in the HARQ states corresponding to the reference time unit exceeds a specific proportion (for example, 80%), the network device increases the CWS; otherwise, the network device decreases the CWS.

It should be understood that, when the network device obtains at least two different HARQ states for any HARQ process identifier, a HARQ state corresponding to the reference time unit is the valid HARQ state in this application.

Further, when the valid HARQ state is the DTX state, the valid HARQ state is considered as a NACK, or the valid HARQ state is ignored and not included in a NACK proportion for calculation.

It should be understood that, for the scenario 1, the first HARQ process identifier may be any HARQ process identifier that is included in the reference time unit and that is for any terminal device. In other words, the second device is any terminal device to which the first device sends downlink information in the reference time unit. The first HARQ process identifier is any downlink HARQ process identifier used for the second device in the reference time unit. The at least one HARQ process identifier that is included in the reference time unit and that is corresponding to the at least one terminal device includes the first HARQ process identifier. Therefore, it may be considered that the network device determines a downlink CWS based on a receiving state or the valid HARQ state that is corresponding to the at least one HARQ process identifier of the at least one terminal device including the first HARQ process identifier. In other words, the HARQ state corresponding to the first HARQ process identifier participates in downlink CWS determining.

For example, the network device schedules the reference time unit to two terminal devices: UE 1 and UE 2. A downlink HARQ process identifier used for scheduling the UE 1 includes #H1 and #H2 of the UE 1, and a downlink HARQ process used for scheduling the UE 2 includes #H1 and #H2 of the UE 2. The second device may be the UE 1, and the first HARQ process identifier may be #H1 of the UE 1. When a valid HARQ state of #H1 of the UE 1 is an ACK, a valid HARQ state of #H2 of the UE 1 is a NACK, and a valid HARQ state of #H1 of the UE 2 is a NACK. When a valid. HARQ state of #H2 of the UE 2 is an ACK, because the NACK accounts for 50% of a total quantity of HARQ states and does not reach the threshold 80%, the network device decreases the CWS when being to send a next downlink burst. The first HARQ process identifier participates in NACK proportion calculation.

Specifically, for the scenario 2, if the terminal device obtains a HARQ state of at least one HARQ process identifier (referred to as an uplink HARQ process identifier set) used by the terminal device to send data in the reference time unit, and at least one HARQ state in the uplink HARQ process identifier set is an ACK, the terminal device decreases the CWS; otherwise (for example, the terminal device does not receive a HARQ state of any HARQ process identifier in the reference time unit, or all HARQ states in the uplink HARQ process identifier set are NACKs), the terminal device increases the CWS.

It should be understood that, when the terminal device obtains at least two different HARQ states for any HARQ process identifier, a HARQ state corresponding to the reference time unit is the valid HARQ state in this application.

It should be understood that, for the scenario 2, the first HARQ process identifier may be any HARQ process identifier corresponding to an uplink reference time unit, in other words, the first HARQ process identifier is any uplink HARQ process identifier used by the first device in the uplink reference time unit. When the at least one HARQ process identifier included in the uplink reference time unit includes the first HARQ process identifier, the terminal device determines an uplink CWS based on a valid HARQ state corresponding to the at least one HARQ process identifier including the first HARQ process identifier, in other words, the HARQ state corresponding to the first HARQ process identifier participates in uplink CWS determining. For example, the terminal device sends uplink data in the reference time unit by using HARQ process identifiers #H1 and #H2, a valid HARQ state of #H1 is an ACK, and a valid HARQ state of #H2 is a TACK. When a valid HARQ state corresponding to one HARQ process identifier thereof is an ACK, the terminal device decreases the CWS. Therefore, the terminal device decreases the CWS. In this case, the first HARQ process identifier may be #H1.

Based on a same concept, this application further provides a device for adjusting a contention window size. The device may be configured to perform the corresponding method embodiment in FIG. 3. Therefore, for an implementation of the device for adjusting a contention window size that is provided in this embodiment of this application, refer to an implementation of the method. Details are not described again.

Figure 11:
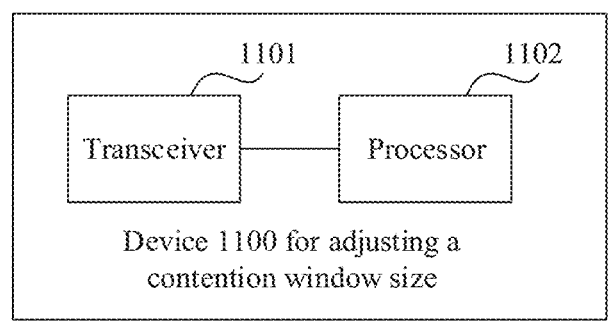
FIG. 11 is a schematic structural diagram of a device for adjusting a contention window size according to an embodiment of this application.

Referring to FIG. 11, an embodiment of this application provides a device 1100 for adjusting a contention window size. The device 1100 includes:

a transceiver 1101, configured to obtain at least two HARQ states corresponding to a first hybrid automatic repeat request HARQ process identifier, where the at least two HARQ states are different, and the first HARQ process identifier is a HARQ process identifier used when the device sends data to a second device in a reference time unit; and a processor 1102, configured to: determine a valid HARQ state in the at least two HARQ states; and adjust a contention window size for a first burst based on the valid HARQ state, where the first burst is later than the reference time unit.

In a possible design, any HARQ states in the at least two HARQ states are corresponding to a same transport block corresponding to the first HARQ process identifier.

In a possible design, the device is a network device, the second device is a terminal device, and the first HARQ process identifier is a HARQ process identifier for the second device.

In a possible design, the device is a terminal device, the second device is a network device, and the first HARQ process identifier is a HARQ process identifier corresponding to the device.

In a possible design, the at least two HARQ states are carried in at least two uplink time units, and the valid HARQ state is a HARQ state carried in an earliest uplink time unit in the at least two uplink time units.

In a possible design, when the at least two HARQ states each are a HARQ state that is sent by the second device and that is detected by the transceiver 1101, the valid HARQ state is the HARQ state carried in the earliest uplink time unit in the at least two uplink time units.

In a possible design, when the at least two HARQ states include a discontinuous transmission DTX state and a non-DTX state, the valid HARQ state is the non-DTX state, and the non-DTX state is a HARQ state that is sent by the second device and that is detected by the transceiver 1101.

In a possible design, the at least two HARQ states are carried in at least two downlink time units, and the valid HARQ state is a HARQ state carried in an earliest downlink time unit in the at least two downlink time units.

In a possible design, when the at least two HARQ states each are carried in HARQ feedback information sent by the second device, the valid HARQ state is the HARQ state carried in the earliest downlink time unit in the at least two downlink time units.

In a possible design, when the at least two HARQ states are respectively carried in HARQ feedback information sent by the second device and scheduling information sent by the second device, and a HARQ state carried in the HARQ feedback information is different from a HARQ state carried in the scheduling information, the valid HARQ state is the HARQ state carried in the HARQ feedback information.

In a possible design, the at least two HARQ states include an acknowledgment ACK state, and the valid HARQ state is the ACK state.

Based on a same concept, this application further provides an apparatus for adjusting a contention window size. The apparatus may be configured to perform the corresponding method embodiment in FIG. 3. Therefore, for an implementation of the apparatus for adjusting a contention window size that is provided in this embodiment of this application, refer to an implementation of the method. Details are not described again.

Figure 12:
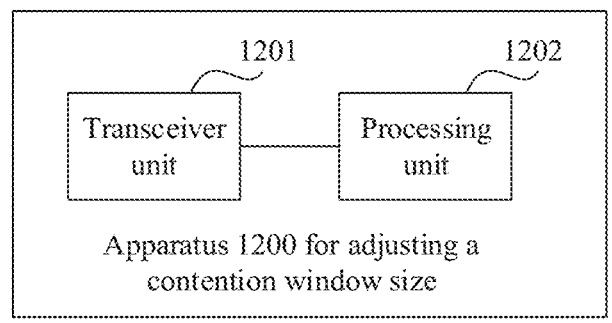
FIG. 12 is a schematic structural diagram of an apparatus for adjusting a contention window size according to an embodiment of this application.

Referring to FIG. 12, an embodiment of this application provides an apparatus 1200 for adjusting a contention window size. The apparatus 1200 includes:

a transceiver unit 1201, configured to obtain at least two HARQ states corresponding to a first hybrid automatic repeat request HARQ process identifier, where the at least two HARQ states are different, and the first HARQ process identifier is a HARQ process identifier used when the device sends data to a second device in a reference time unit; and a processing unit 1202, configured to: determine a valid HARQ state in the at least two HARQ states; and adjust a contention window size for a first burst based on the valid HARQ state, where the first burst is later than the reference time unit.

It should be noted that, in a specific implementation, a function of the transceiver unit 1201 in FIG. 12 may be implemented by the transceiver 1101 in FIG. 11, and a function of the processing unit 1202 may be implemented by the processor 1102 in FIG. 11.

This application further provides a communications system, including a first device and a second device.

In conclusion, the embodiments of this application provide a method for adjusting a contention window size. The method includes: obtaining, by a first device, at least two HARQ states corresponding to a first hybrid automatic repeat request HARQ process identifier, where the at least two HARQ states are different, and the first HARQ process identifier is a HARQ process identifier used when the first device sends data to a second device in a reference time unit; determining, by the first device, a valid HARQ state in the at least two HARQ states; and adjusting a contention window size for a first burst based on the valid HAM) state, where the first burst is later than the reference time unit. Therefore, according to the method provided in the embodiments of this application, the first device can avoid inaccurate CWS adjustment caused by subsequently resetting a HARQ-ACK to a default state, so as to improve accuracy of contention window adjustment, and improve channel access efficiency.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, and an optical memory) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored on a computer-readable memory that can instruct the computer or any other programmable data processing device to work in a specific manner, so that the instructions stored on the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more procedures in the flowcharts and/or in one or more blocks in the block diagrams.

Apparently, a person skilled in the art can make various modifications and variations to the embodiments of this application without departing from the spirit and scope of this application. This application is intended to cover these modifications and variations provided that they fall within the scope of protection defined by the following claims and their equivalent technologies of this application,

What is claimed is:

1. A method, comprising:
   obtaining, by a first device, at least two hybrid automatic repeat request (HARQ) states corresponding to a first HARQ process identifier, wherein the at least two HARQ states are different, and wherein the first HARQ process identifier is a HARQ process identifier used when the first device sends data to a second device in a reference time unit;
   in response to obtaining the at least two HARQ states, selecting, by the first device, a HARQ state from the obtained at least two HARQ states as a valid HARQ state; and
   adjusting, by the first device, a contention window size for a first burst based on the valid HARQ state, wherein the first burst is later than the reference time unit, wherein any time unit that carries the at least two HARQ states is later than the reference time unit, and wherein a time interval between any time unit that carries the at least two HARQ states and the reference time unit is not less than a first preset time interval.

2. The method according to claim 1, wherein the first device is a network device, wherein the second device is a terminal device, and wherein the first HARQ process identifier is a HARQ process identifier for the second device.

3. The method according to claim 1, wherein the first device is a terminal device, wherein the second device is a network device, and wherein the first HARQ process identifier is a HARQ process identifier corresponding to the first device.

4. The method according to claim 2, wherein the at least two HARQ states are carried in at least two uplink time units, and wherein when the at least two HARQ states each are a HARQ state received by the first device, the valid HARQ state is a HARQ state carried in an earliest uplink time unit in the at least two uplink time units.

5. The method according to claim 2, wherein when the at least two HARQ states comprise a discontinuous transmission (DTX) state and a non-DTX state, the valid HARQ state is the non-DTX state, and wherein the non-DTX state is a HARQ state received by the first device.

6. The method according to claim 5, wherein when the at least two HARQ states comprise a DTX state and at least two non-DTX states, and the at least two non-DTX states are carried in at least two uplink time units, the valid HARQ state is a non-DTX state carried in an earliest uplink time unit in the at least two uplink time units.

7. The method according to claim 3, wherein the at least two HARQ states are carried in at least two downlink time units, and wherein the valid HARQ state is a HARQ state carried in an earliest downlink time unit in the at least two downlink time units.

8. The method according to claim 7, wherein when the at least two HARQ states each are carried in HARQ feedback information sent by the second device, the valid HARQ state is the HARQ state carried in the earliest downlink time unit in the at least two downlink time units.

9. The method according to claim 1, wherein the at least two HARQ states comprise an acknowledgment (ACK) state, and wherein the valid HARQ state is the ACK state.

10. A first device, comprising:
    a transceiver, the transceiver configured to obtain at least two hybrid automatic repeat request (HARQ) states corresponding to a first HARQ process identifier, wherein the at least two HARQ states are different, and wherein the first HARQ process identifier is a HARQ process identifier used when the first device sends data to a second device in a reference time unit;
    at least one processor; and
    one or more memories coupled to the at least one processor and storing programming instructions for execution by the at least one processor to:
      in response to obtaining the at least two HARQ states, select a HARQ state from the obtained at least two HARQ states as a valid HARQ state; and
    adjust a contention window size for a first burst based on the valid HARQ state, wherein the first burst is later than the reference time unit, wherein any time unit that carries the at least two HARQ states is later than the reference time unit, and wherein a time interval between any time unit that carries the at least two HARQ states and the reference time unit is not less than a first preset time interval.

11. The first device according to claim 10, wherein the first device is a network device, wherein the second device is a terminal device, and wherein the first HARQ process identifier is a HARQ process identifier for the second device.

12. The first device according to claim 10, wherein the first device is a terminal device, wherein the second device is a network device, and wherein the first HARQ process identifier is a HARQ process identifier corresponding to the first device.

13. The first device according to claim 11, wherein the at least two HARQ states are carried in at least two uplink time units, and wherein when the at least two HARQ states each are a HARQ state received by the first device, the valid HARQ state is a HARQ state carried in an earliest uplink time unit in the at least two uplink time units.

14. The first device according to claim 11, wherein when the at least two HARQ states comprise a discontinuous transmission (DTX) state and a non-DTX state, the valid HARQ state is the non-DTX state, and wherein the non-DTX state is a HARQ state received by the first device.

15. The first device according to claim 14, wherein when the at least two HARQ states comprise a DTX state and at least two non-DTX states, and the at least two non-DTX states are carried in at least two uplink time units, the valid HARQ state is a non-DTX state carried in an earliest uplink time unit in the at least two uplink time units.

16. The first device according to claim 12, wherein the at least two HARQ states are carried in at least two downlink time units, and wherein the valid HARQ state is a HARQ state carried in an earliest downlink time unit in the at least two downlink time units.

17. The first device according to claim 16, wherein when the at least two HARQ states each are carried in HARQ feedback information sent by the second device, the valid HARQ state is the HARQ state carried in the earliest downlink time unit in the at least two downlink time units.

18. The first device according to claim 10, wherein the at least two HARQ states comprise an acknowledgment (ACK) state, and wherein the valid HARQ state is the ACK state.

19. A non-transitory computer-readable storage medium comprising instructions which, when executed by at least one processor in a first device, cause the at least one processor to:
   obtain at least two hybrid automatic repeat request (HARQ) states corresponding to a first HARQ process identifier, wherein the at least two HARQ states are different, and wherein the first HARQ process identifier is a HARQ process identifier used when the first device sends data to a second device in a reference time unit;
   in response to obtaining the at least two HARQ states, select a HARQ state from the obtained at least two HARQ states as a valid HARQ state; and
   adjust a contention window size for a first burst based on the valid HARQ state, wherein the first burst is later than the reference time unit, wherein any time unit that carries the at least two HARQ states is later than the reference time unit, and wherein a time interval between any time unit that carries the at least two HARQ states and the reference time unit is not less than a first preset time interval.

20. The non-transitory computer-readable storage medium according to claim 19, wherein the at least two HARQ states are carried in at least two uplink time units, and wherein when the at least two HARQ states each are a HARQ state received by the first device, the valid HARQ state is a HARQ state carried in an earliest uplink time unit in the at least two uplink time units.

* * * * *